United States Patent [19]

Engeler

[11] Patent Number: 5,187,680

[45] Date of Patent: Feb. 16, 1993

[54] NEURAL NET USING CAPACITIVE STRUCTURES CONNECTING INPUT LINES AND DIFFERENTIALLY SENSED OUTPUT LINE PAIRS

[75] Inventor: William E. Engeler, Scotia, N.Y.

[73] Assignee: General Electric Company, Schenectady, N.Y.

[21] Appl. No.: 810,431

[22] Filed: Dec. 18, 1991

Related U.S. Application Data

[63] Continuation of Ser. No. 366,838, Jun. 15, 1989, abandoned.

[51] Int. Cl.⁵ .......................... G06G 7/12; G06G 7/06
[52] U.S. Cl. .................................. 364/807; 307/201; 395/24; 395/27
[58] Field of Search ........................ 307/201; 364/807; 395/24, 27

[56] References Cited

U.S. PATENT DOCUMENTS

| | | | |
|---|---|---|---|
| 3,890,618 | 6/1975 | Speiser | 342/202 |
| 3,890,635 | 6/1975 | Engeler | 357/14 |
| 4,156,284 | 5/1979 | Engeler | 364/862 |
| 4,161,785 | 7/1979 | Gasparek | 364/827 |
| 4,267,580 | 5/1981 | Bond et al. | 364/824 |
| 4,288,858 | 9/1981 | Merola et al. | 364/826 |
| 4,873,455 | 10/1989 | de Chambost et al. | 307/201 |
| 4,903,226 | 2/1990 | Tsividis | 364/807 |
| 4,950,917 | 8/1990 | Holler et al. | 307/201 |
| 4,951,239 | 8/1990 | Andes et al. | 364/807 |

OTHER PUBLICATIONS

Séquin, C., et al., "Self-Contained Charge-Coupled Split-Electrode Filters Using a Novel Sensing Technique", *IEEE J. Solid-State Circuits*, vol. SC-12, No. 6, Dec. 1977, pp. 626–632.

"EG&G Reticon R5403 Analog-Analog Correlator/Convolver", copyright 1979, 5 pages of R5403 description and typical applications.

Lau, G., "Neural Networks, I: Theory and Modelling", *Proc. IEEE*, vol. 78, No. 9, Sep. 1990, pp. 1411–1414.

Widrow B. et al., "30 Years of Adaptive Neural Networks: Perceptron, Madaline, and Backpropagation", *Proc. IEEE*, vol. 78, No. 9, Sep. 1990, pp. 1415–1441.

Moore, S., "Eliminate the guesswork in analog-switch error analysis", *EDN*, Nov. 26, 1987, pp. 219–225.

Raffel, J., "Electronic Implementation of Neuromorphic Systems", *IEEE Custom Integrated Circuits Conf.*, May 1988, pp. 10.1.1–10.1.7.

Wasserman, P. et al., "Neural Networks, Part 2: What are they and why is everybody so interested in them now?", *IEEE Expert*, Spring 1988, pp. 10–15.

Bibyk, S. et al., "Issues in Analog VLSI and MOS Techniques for Neural Computing", *Analog VLSI Implementation of Neural Systems*, Mead, C., et al., eds., copyright 1989 by Kluwer Academic Publishers, pp. 103–133.

Herrman, E. et al., "Programmable CCD Correlator", *IEEE Trans. on Electron Devices*, vol. ED-26, No. 2, Feb. 1979, pp. 117–122.

(List continued on next page.)

*Primary Examiner*—Stephen M. Baker
*Attorney, Agent, or Firm*—Marvin Snyder

[57] ABSTRACT

Neural nets using capacitive structures are adapted for construction in complementary metal-oxide-semiconductor integrated-circuit technology. In each neural net layer synapse input signals are applied to the inverting and non-inverting input terminals of each of a plurality of differential-input non-linear amplifiers by a respective pair of capacitors, which non-linear amplifiers generate respective axon responses. In certain of these neural nets, arrangements are described that make the capacitive structures bilaterally responsive, so that back-propagation calculations can be performed to alter the relative values of capacitors in each pair thereof, which is done during training of certain of the neural nets described.

56 Claims, 15 Drawing Sheets

OTHER PUBLICATIONS

Sage, J. et al., "CCD Analog-Analog Correlator with Four-FET Bridge Multipliers", Proc. 11th. Conf. on Solid-Devices, Tokyo, 1979, *Japan J. of Appl. Phys.*, vol. 19 (1980), Sppl. 19-1, pp. 265-268.

Mavor, J. et al., "A Monolithic CCD Programmable Transversal Filter for Analogue Signal Processing", *The Radio and Electronic Engineer*, vol. 50, No. 5, pp. 213-225, May 1980.

Kub, F. et al., "Programmable Analog Synapses for Microelectronic Neural Networks Using a Hybrid Digital-Analog Approach", Submitted to IEEE Int'l. Conf. on Neural Networks, Jul. 24-27, San Diego.

"An Introduction to Computing With Neural Nets", R. P. Lippmann, *IEEE ASSP Magazine*, Apr. 1987, pp. 4-22.

"Switched-Capacitor Neural Networks", Y. P. Tsividis & D. Anastassion, *Electronics Letters*, Aug. 27, 1987, vol. 23, No. 18, pp. 958-959.

"Analog MOS Integrated Circuits for Signal Processing", R. Gregorian & G. C. Temes, pp. 255-237, John Wiley & Sons, NYC, Chichester, Brisbane, Toronto, Singapore 1986.

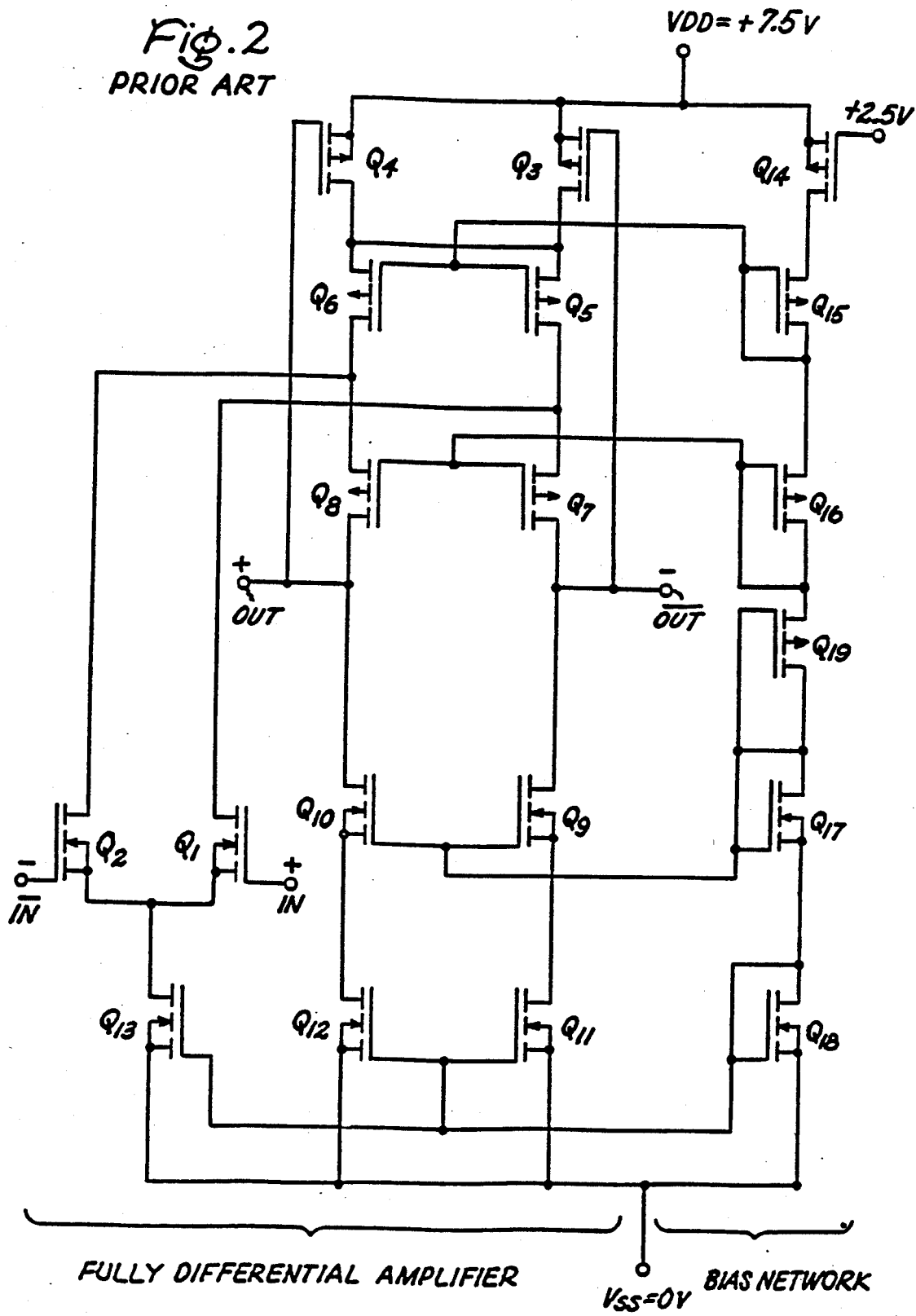

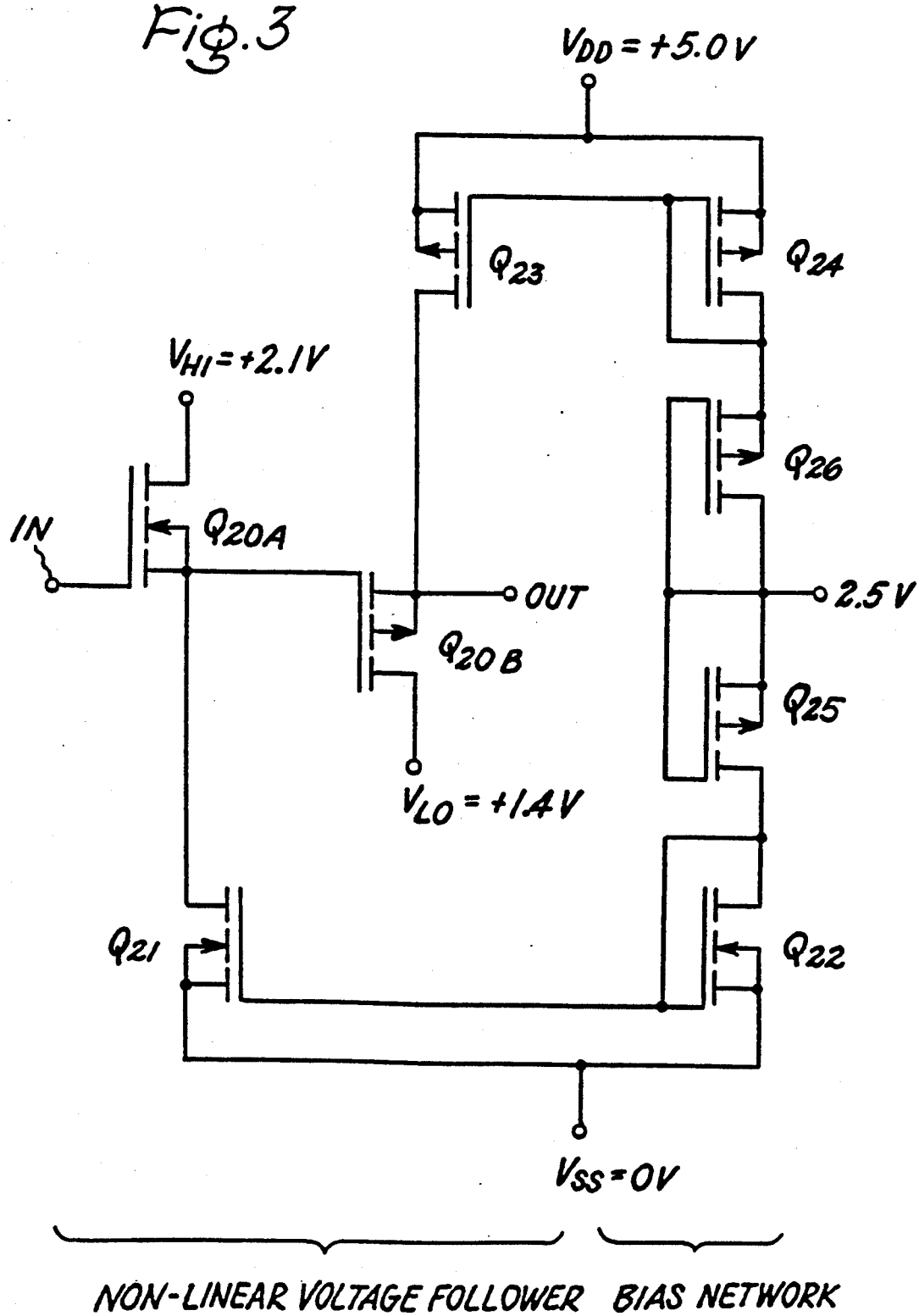

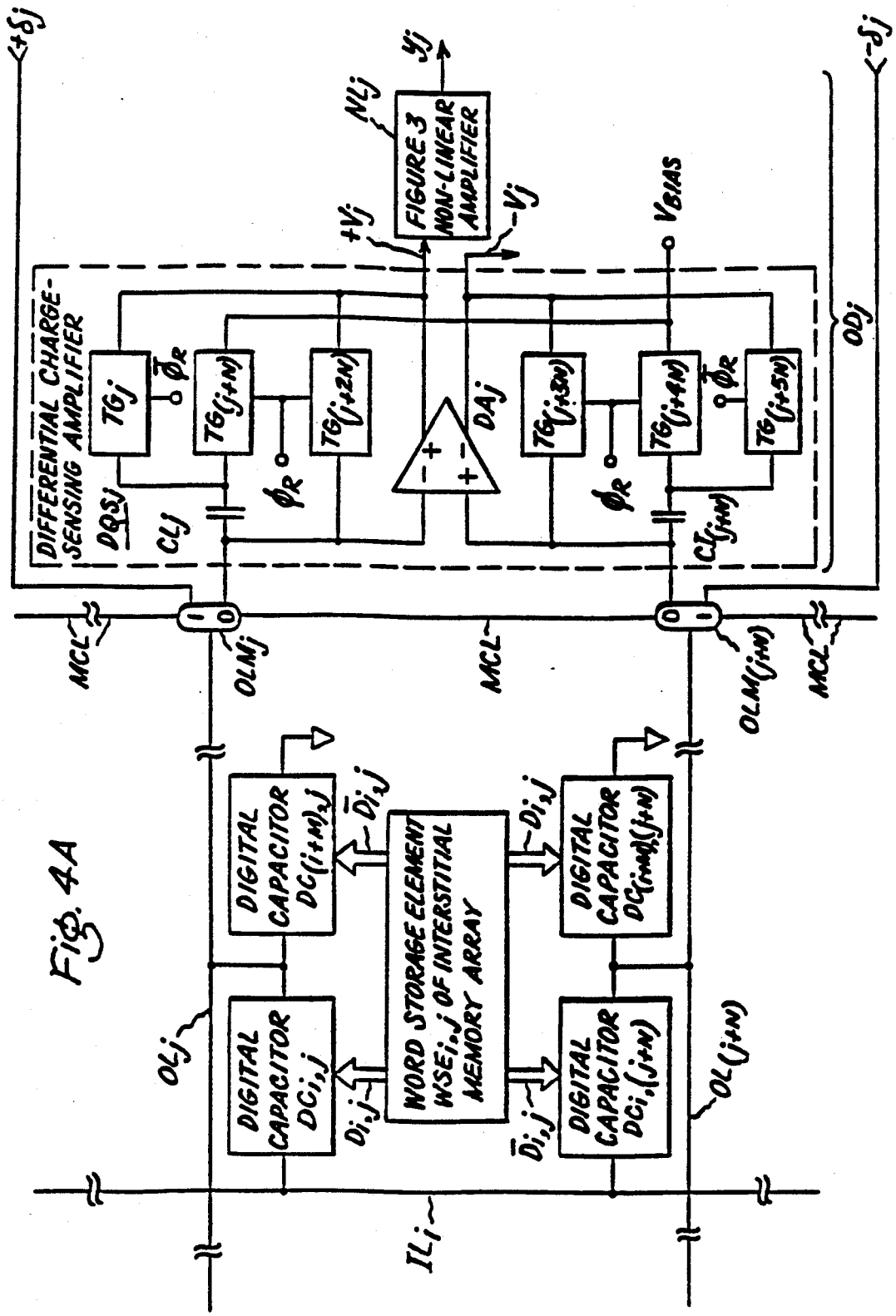

NEURAL NET USING CAPACITIVE STRUCTURES CONNECTING INPUT LINES AND DIFFERENTIALLY SENSED OUTPUT LINE PAIRS

This application is a continuation of application Ser. No. 07/366,838, filed Jun. 15, 1989, now abandoned.

The invention relates to computer structures that emulate portions of a brain in operation, and more particularly, to such computer structures as can be realized using complementary metal-oxide-semiconductor (CMOS) technology.

RELATIONSHIP TO OTHER DISCLOSURES

A patent application Ser. No. 366,839, now U.S. Pat. No. 5,146,542, concurrently filed by the inventor, entitled NEURAL NET USING CAPACITIVE STRUCTURES CONNECTING OUTPUT LINES AND DIFFERENTIALLY DRIVEN INPUT LINE PAIRS and assigned to General Electric Company, discloses alternative neural net structures to those described herein.

BACKGROUND OF THE INVENTION

Computers of the von Neumann type architecture have limited computational speed owing to the communication limitations of the single processor. These limitations may be overcome if a plurality of processors are utilized in the calculation and are operated at least partly in parallel. This alternative architecture, however, generally leads to difficulties associated with programming complexity. Therefore, it is often not a good solution. Recently, an entirely different alternative that does not require programming has shown promise. The networking ability of the neurons in the brain has served as a model for the formation of a highly interconnected set of processors, called a "neural network" or "neural net" that can provide computational and reasoning functions without the need of formal programming. The neural nets can learn the correct procedure by experience rather than being preprogrammed for performing the correct procedure. The reader is referred to R.P. Lippmann's article "An Introduction to Computing With Neural Nets" appearing on pages 4-21 of the April 1987 *IEEE ASSP MAGAZINE* (07407467/87/0400-0004/$10.00" 1987 IEEE), incorporated herein by reference, for background about the state of the art in regard to neural nets.

Neural nets are composed of a plurality of neuron models, processors each exhibiting "axon" output signal response to a plurality of "synapse" input signals. In a type of neural net called a "perceptron", each of these processors calculates the weighted sum of its "synapse" input signals, which are respectively weighted by respective weighting values that may be positive- or negative-valued, and responds non-linearly to the weighted sum to generate the "axon" output response. This relationship may be described in mathematical symbols as follows.

$$v_j = f\left(\sum_{i=1}^{M} W_{i,j} x_i\right) \quad j = 1, 2, \ldots N \quad (1)$$

Here, i indexes the input signals of the perceptron, of which there are an integral number M, and j indexes its output signals, of which there are an integral number N. $W_{i,j}$ is the weighting of the $i^{th}$ input signal as makes up the $j^{th}$ output signal at such low input signal levels that the function $$f\left(\sum_{i=1}^{M} W_{i,j} x_i\right)$$

is approximately linear. At higher absolute values of its argument, the function $$f\left(\sum_{i=1}^{M} W_{i,j} x_i\right)$$

no longer exhibits linearity but rather exhibits a reduced response to $$\sum_{i=1}^{M} W_{i,j} x_i.$$

A more complex artificial neural network arranges a plurality of perceptrons in hierarchic layers, the output signals of each earlier layer providing input signals for the next succeeding layer. Those layers preceding the output layer providing the ultimate output signal(s) are called "hidden" layers.

The processing just described normally involves sampled-data analog signals, and prior-art neural nets have employed operational amplifiers with resistive interconnecting elements for the weighting and summing procedures. The resistive elements implement weighted summation being done in accordance with Ohm's Law. The speed of such a processor is limited by capacitances in various portions of the processor, and computations have been slow if the power consumption of a reasonably large neural net is to be held within reasonable bounds. That is, speed is increased by reducing resistance values to reduce RC time constants in the processors, but the reduced resistance values increase the $V^2/R$ power consumption (R, C and V being resistance, capacitance and voltage, respectively.)

Using capacitors to perform weighted summation in accordance with Coulomb's Law can provide neural nets of given size operating at given speed that consume less power than those the processors of which use conductive elements such as resistors to implement weighted summation in accordance with Ohm's Law.

This metal-oxide-metal construction of capacitors is described in detail by the inventor in his U.S. Pat. No. 3,691,627 issued Sep. 19, 1972, entitled "METHOD OF FABRICATING BURIED METALLIC FILM DEVICES", assigned to General Electric Company and incorporated by reference herein. In the inventor's U.S. Pat. No. 4,156,284 issued May 22, 1979, entitled "SIGNAL PROCESSING APPARATUS" and assigned to General Electric Company the use of a metal-oxide-metal construction of capacitors in the construction of arrays of weighting capacitors in an MOS integrated circuit is described in connection with apparatus for performing matrix multiplication.

Y.P. Tsividis and D. Anastassion in a letter "Switched-Capacitor Neural Networks" appearing in ELECTRONICS LETTERS, Aug. 27, 1987, Vol. 23, No. 18, pages 958, 959 (IEE) describe one method of implementing weighted summation in accordance with Coulomb's Law. Their method, a switched capacitor method, is useful in analog sampled-data neural net systems. However, a method of implementing weighted summation in accordance with Coulomb's Law that does not rely on capacitances being switched is highly desirable, it is here pointed out. This avoids the complexity of the capacitor switching elements and associated control lines. Furthermore, operation of the neural net with continuous analog signals over sustained periods of time, as well as with sampled data analog signals, is thus made possible.

A problem that is encountered when one attempts to use capacitors to perform weighted summation in a neural net layer is associated with the stray capacitance between input and output lines, which tends to be of appreciable size in neural net layers constructed using a metal-oxide-semiconductor (MOS) integrated circuit technology. The input and output lines are usually laid out as overlapping column and row busses using plural-layer metallization. The column busses are situated in one layer of metallization and the row busses are situated in another layer of metallization separated from the other layer by an intervening insulating oxide layer. This oxide layer is thin, so there is appreciable capacitance at each crossing of one bus over another. The fact of the row and column busses being in different planes tends to increase stray capacitances between them. The stray capacitance problem is also noted where both row and column busses are situated in the same metallization layer with one set of busses being periodically interrupted in their self-connections to allow passage of the other set of busses and being provided with cross-over connections to complete their self-connections. The problem of stray capacitance is compounded by the fact that the capacitive elements used to provide weights in a capacitive voltage summation network have stray capacitances to the substrate of the monolithic integrated circuit in which they are incorporated; a perfect two-terminal capacitance is not actually available in the monolithic integrated circuit. Where capacitive elements having programmable capacitances are used, capacitance is usually not programmable to zero value, either.

The problems of stray capacitance are solved in the invention by using output line pairs and sensing the charge conditions on the output lines of each pair differentially so that the effects of stray capacitances tend to cancel each other out. These output line pairs facilitate both excitory and inhibitory weights—that is, both positive- and negative-polarity $W_{i,j}$—in effect to be achieved without having to resort to capacitor switching to achieve negative capacitance.

Neural nets employing capacitors in accordance with the invention lend themselves to being used in performing parts of the computations needed to implement a back-propagation training algorithm. The back-propagation training algorithm is an iterative gradient algorithm designed to minimize the mean square error between the actual output of a multi-layer feed-forward neural net and the desired output. It requires continuous, differentiable non-linearities. A recursive algorithm starting at the output nodes and working back to the first hidden layer is used iteratively to adjust weights in accordance with the following formula.

$$W_{i,j}(t+1) = W_{i,j}(t) - \eta \delta_j x_i \qquad (2)$$

In this equation $W_{i,j}(t)$ is the weight from hidden node i (or, in the case of the first hidden layer, from an input node) to node j at time t; $x_i$ is either the output of node i (or, in the case of the first hidden layer, is an input signal); $\eta$ is a gain term introduced to maintain stability in the feedback procedure used to minimize the mean square errors between the actual output(s) of the perceptron and its desired output(s); and $\delta_j$ is a derivative of error. The general definition of $\delta_j$ is the change in error energy from output node j of a neural net layer with a change in the weighted summation of the input signals used to supply that output node j.

Lippman presumes that a particular sigmoid logistic non-linearity is used. Presuming the non-linearity of processor response is to be defined not as restrictively as Lippmann does, then $\delta_j$ can be more particularly defined as in equation (2), following, if node j is an output node, or as in equation (3), following, if node j is an internal hidden node.

$$\delta_j = y_j' (d_j - y_j) \qquad (3)$$

$$\delta_j = y_j' \sum_k \delta_k W_{j,k} \qquad (4)$$

In equation (3) $d_j$ and $y_j$ are the desired and actual values of output response from the output layer and $y_j'$ is differential response of $y_j$ to the non-linearity in the output layer—i.e., the slope of the transfer function of that non-linearity. In equation (4) k is over all nodes in the neural net layer succeeding the hidden node j under consideration and $W_{j,k}$ is the weight between node j and each such node k. The term $y_j'$ is defined in the same way as in equation (3).

The general definition of the $y_j'$ term appearing in equations (3) and (4), rather than that general term being replaced by the specific value of $y_j'$ associated with a sigmoid logistic non-linearity, is the primary difference between the training algorithm as described here and as described by Lippmann. Also, Lippmann defines $\delta_j$ in opposite polarity from equations (1), (3) and (4) above.

During training of the neural net, prescribed patterns of input signals are sequentially repetitively applied, for which patterns of input signals there are corresponding prescribed patterns of output signals known. The pattern of output signals generated by the neural net, responsive to each prescribed pattern of input signals, is compared to the prescribed pattern of output signals to develop error signals, which are used to adjust the weights per equation (2) as the pattern of input signals is repeated several times, or until the error signals are detected as being negibly valued. Then training is done with the next set of patterns in the sequence. During extensive training the sequence of patterns may be recycled.

SUMMARY OF THE INVENTION

The invention generally concerns neural nets the processors of which use capacitors to perform weighted summation in accordance with Coulomb's Law. Each processor includes a plurality, M in number, of input lines for receiving respective ones of M input voltage signals. Each processor has first and second output lines. Respective capacitive elements connect each input signal line to each of the first and second output lines. Means are provided for maintaining substantially equal capacitances from the output lines to their respective surroundings. A differential-input non-linear amplifier has inverting and non-inverting input ports to which the first and second output lines connect and has an output port for supplying neuron-like response to the M input signal voltages.

BRIEF DESCRIPTION OF THE DRAWING

FIG. 2 is a schematic diagram of a prior art fully differential amplifier and a bias network therefore, as implemented with complementary metal-oxide-semiconductor CMOS field effect transistors, which is useful in the construction of neural nets in accordance with the invention.

FIG. 3 is a schematic diagram of a non-linear voltage amplifier that is useful in the construction of neural nets in accordance with the invention.

FIGS. 4A and 4B together form a FIG. 4 that is a schematic diagram of a modification of the FIG. 1 neural net that can be made manifold times to provide in accordance with a further aspect of the invention, for the programmable weighting of the capacitances used in performing weighted summation of synapse signals.

DETAILED DESCRIPTION

Figure 1:
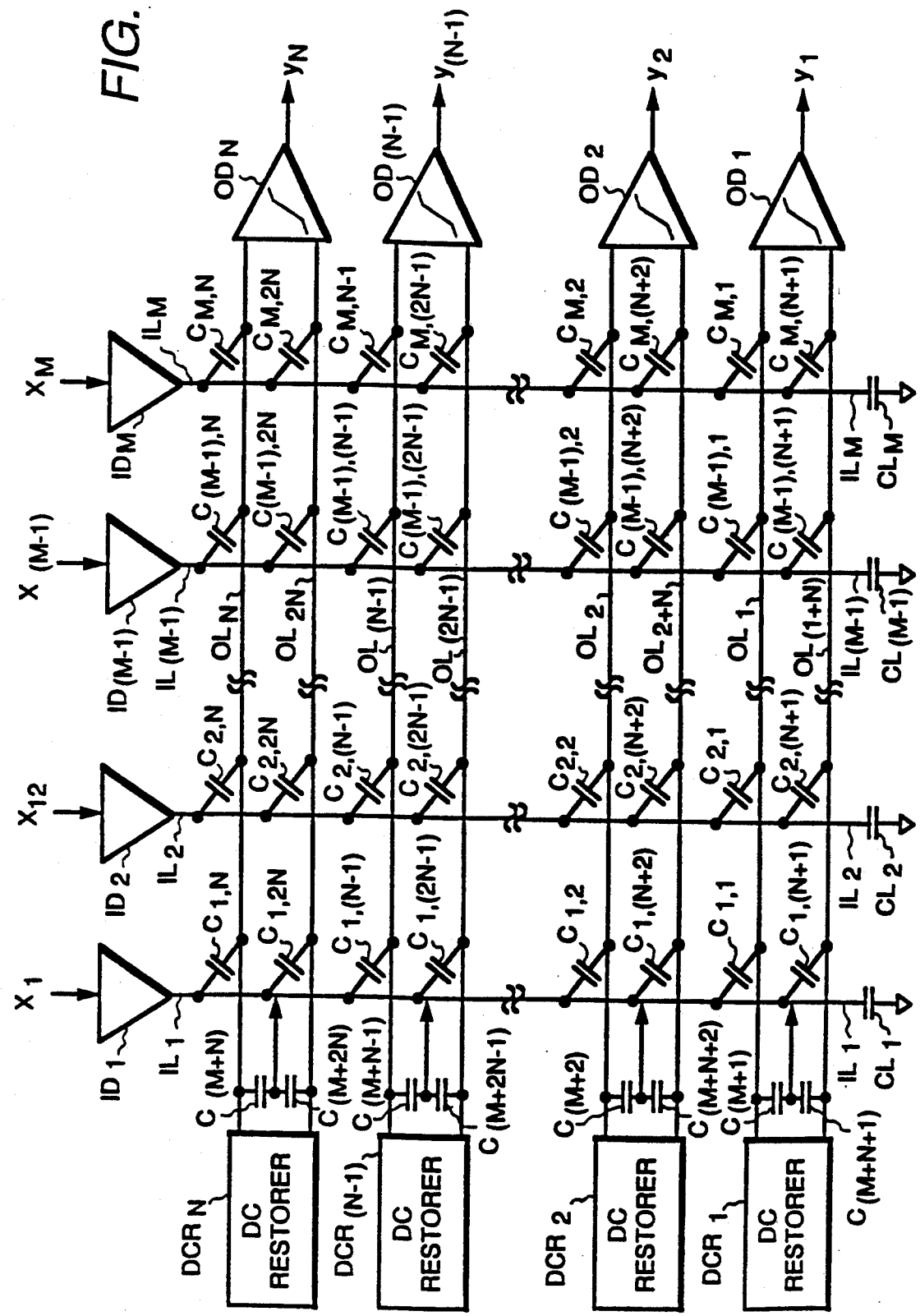
FIG. 1 is a schematic diagram of a neural net layer which embodies the invention, using capacitors to perform weighted summations of synapse signals to be subsequently linearly combined and non-linearly amplified to generate axon response signals.

FIG. 1 shows a neural net comprising a plurality, N in number, of non-linear amplifiers $OD_1$, $OD_2$, ... $OD_{(N-1)}$, $OD_N$. Each of a plurality, M in number, of input voltage signals $x_1$, $x_2$, ... $x_{(M-1)}$, $x_M$ supplied as "synapse" signals is weighted to provide respective input voltages for the non-linear voltage amplifiers $OD_1$, $OD_2$, ... $OD_{(N-1)}$, $OD_N$, which generate respective "axon" responses $y_1$, $y_2$, ... $y_{(N-1)}$, $y_N$.

M is a positive plural integer indicating the number of input synapse signals to the FIG. 1 net, and N is a positive plural integer indicating the number of output axon signals the FIG. 1 net can generate. To reduce the written material required to describe operation of the FIG. 1 neural net, operations using replicated elements will be described in general terms; using a subscript i ranging over all values one through M for describing operations and apparatuses as they relate to the (column) input signals $x_1$, $x_2$, ... $x_{(M-1)}$, $x_M$; and using a subscript j ranging over all values one through N for describing operations and apparatus as they relate to the (row) output Signals $y_1$, $y_2$, ... $y_{(N-1)}$, $Y_N$. That is, i and j are the column and row numbers used to describe particular portions of the neural net.

Input voltage signal $x_i$ is applied to the input port of an input driver amplifier $ID_i$ that is a voltage amplifier which in turn applies its voltage response to an input line $IL_i$. Respective output lines $OL_j$ and $OL_{(j+N)}$ connect to the non-inverting input port of output driver amplifier $OD_j$ and to its inverting input port. Output driver amplifier $OD_j$ generates at its output port a non-linear voltage response to the cumulative difference in charge on that respective pair of output lines $OL_j$ and $OL_{(j+N)}$.

The non-linear output driver amplifier $OD_j$ is shown in FIG. 1 as simply being a differential-input non-linear voltage amplifier with the quiescent direct potential applied to its (+) and (−) input signal terminals via output lines $OL_j$ and $OL_{(j+N)}$ being adjusted by clamping to a desired bias voltage at selected times using a respective direct-current restorer circuit $DCR_j$. The total capacitance of output line $OL_j$ to its surroundings and the total capacitance of output line $OL_{(j+N)}$ to its surroundings are caused to be substantially the same, as will be more particularly described below. A respective capacitor $C_{i,j}$ connects each of the input lines $IL_i$ to each of the output lines $OL_j$, and a respective capacitor $C_{i,(j+N)}$ connects each of the input lines $IL_i$ to each of the output lines $OL_{(j+N)}$. Since at its output terminal the output driver amplifier $OD_j$ responds without inversion to $x_i$ input signal voltage applied to its non-inverting (+) input terminal via capacitor $C_{i,j}$ and responds with inversion to $x_i$ input signal voltage applied to its inverting (−) input terminal via capacitor $C_{i,(j+N)}$, respectively, the electrically equivalent circuit is $x_i$ signal voltage being applied to a single output line $OL_j$ by a capacitor having a capacitance that equals the capacitance of $C_{i,j}$ minus the capacitance of $C_{i,(j+N)}$. This technique of single-ended output signal drive to paired output lines that are differentially sensed avoids the need for switched-capacitance techniques in order to obtain inhibitory (or negative) weights as well as excitory (or positive) weights. Thus this technique facilitates operating the neural net with analog signals that are continuous over sustained periods of time, if so desired.

FIG. 1 shows each of the input lines $IL_i$ as being provided with a respective load capacitor $CL_i$ to cause that capacitive loading upon the output port of the input driver amplifier $ID_i$ to be substantially the same as that upon each output port of the other input driver amplifiers. This is desirable for avoiding unwanted differential delay in responses to the input signals $x_i$. Substantially equal capacitive loading can be achieved by making the capacitance of each of the input line loading capacitors $CL_1$-$CL_M$ very large compared to the total capacitance of the capacitors $C_{i,j}$ connecting thereto. Preferably, however, this result is achieved by making the capacitance of each of the input line loading capacitors complement the combined value of the other capacitances connecting thereto. This procedure reduces the amount of line loading capacitance required. Where the voltages appearing on the output lines $OL_j$ and $OL_{(j+N)}$ are sensed directly by the non-linear output driver amplifiers $OD_1, \ldots OD_N$, as shown in FIG. 1, this procedure makes the voltage division ratio for each input voltage $x_1, \ldots x_m$ independent of the voltage division ratios for the other input voltages.

FIG. 1 also shows each of the output lines $OL_j$ being loaded with a respective load capacitor $CL_{(M+j)}$ and each of the output lines $OL_{(N+j)}$ being loaded with a respective load capacitor $CL_{(M+N+j)}$. This is done so that the total capacitance on each output line remains substantially the same as on each of the other output lines. This can be done by choosing $CL_{(M+j)}$ to be much larger than other capacitances to output line $OL_j$, and by choosing $CL_{(M+N+j)}$ to be much larger than other capacitances to output line $OL_{(N+j)}$. Alternatively, this can be done by choosing $CL_{(M+j)}$ and $CL_{(M+N+j)}$ to complement the combined value of the other capacitances connecting the same output line. The input voltage to output driver amplifier $OD_j$ will (to good approximation) have the following value, $v_j$, in accordance with Coulomb's Law.

$$v_j = (C_j)^{-1} \sum_{i=1}^{M} (C_{i,j} - C_{i,(j+M)}) x_i \quad (5)$$

The generation of voltage $v_j$ can be viewed as the superposition of a plurality of capacitive divisions between, on the one hand, the effective capacitance $(C_{(i,j)} - C_{i,(j+N)})$ each input voltage has to output line $OL_j$ and, on the other hand, the total capacitance $C_j$ of the output line to its surroundings. That is, $C_j$ is the total capacitance on output line $OL_j$ or the total capacitance on output line $OL_{(N+j)}$, which capacitances should be equal to each other and fixed in value. Where the difference in charge appearing on the output lines $OL_j$ and $OL_{(j+N)}$ is sensed by fully differential charge-sensing amplifiers preceding the non-linear voltage amplifiers in the output driver amplifiers, as will be described later on in this specification in connection with FIG. 4, the output signals from the charge-sensing amplifiers will be balanced with reference to a reference $V_{BIAS}$ potential.

FIG. 2 shows a fully differential amplifier constructed of MOS field-effect transistors $Q_1-Q_{13}$, as may serve for any one of the fully differential amplifiers $DA_j$ for $j=1, 2, \ldots N$. Also shown is a bias network constructed of MOS field effect transistors $Q_{14}-Q_{19}$ for generating direct bias potentials for application to that fully differential amplifier and to others of its kind. This circuitry is described in more detail on pages 255-257 of the book *Analog MOS Integrated Circuits for Signal Processing* by R. Gregorian and G.C. Temes, copyright 1986, published by John Wiley & Sons, Inc., of New York, Chichester, Brisbane, Toronto and Singapore.

The fully differential amplifier includes a long-tailed-pair connection of n-channel MOSFETs $Q_1$ and $Q_2$ providing common-mode rejection for the input voltages IN and $\overline{IN}$ applied to the (+) and (−) input terminals at their respective gate electrodes. N-channel MOSFET $Q_{13}$ is connected as a constant-current sink for tail current from the interconnection between the source electrodes of $Q_1$ and $Q_L$. $Q_1$ and $Q_2$ are in folded cascode connections with p-channel MOSFETs $Q_7$ and $Q_8$ respectively. There is also common mode rejection for output voltages OUT and $\overline{OUT}$ appearing at the (+) and (−) output terminals connecting from the drain electrodes of $Q_7$ and $Q_8$ respectively, which is why the differential amplifier comprising $Q_1-Q_{13}$ is described as being "fully" differential. This common mode rejection is provided by common-mode degenerative feedback connections from the (−) and (+) output terminals to the gate electrodes of p-channel MOSFETs $Q_3$ and $Q_4$, the paralleled source-to-drain paths of which supply current to the joined source electrodes of p-channel MOSFETs $Q_5$ and $Q_6$ operated as a current splitter. $Q_5$ drain current biases the folded cascode connection of $Q_1$ and $Q_7$, and $Q_6$ drain current biases the folded cascode connection of $Q_2$ and $Q_8$. N-channel MOSFETs $Q_9$ and $Q_{11}$ are in a cascode connection biased to provide a high-impedance constant-current sink as drain load to $Q_7$, and n-channel MOSFETs $Q_{10}$ and $Q_{12}$ are in a cascode connection biased to provide a high-impedance constant-current sink as drain load to $Q_8$.

The (+) and (−) output terminals can be biased to the same (+2.5 v) potential as applied to the gate electrode of MOSFET $Q_{14}$ by causing MOSFETs $Q_1-Q_{18}$ to have the following width-to-length ratios presuming $Q_1$, $Q_2$, $Q_7$ and $Q_8$ to have equal amplitude quiescent channel currents.

| | |
|---|---|
| $(W/L)_{11}:(W/L)_{12}:(W/L)_{13}:(W/L)_{18}::2:2:1:1$ | (6) |
| $(W/L)_3:(W/L)_4:(W/L)_{14}::1:1:1$ | (7) |
| $(W/L)_5:(W/L)_6:(W/L)_{15}::1:1:1$ | (8) |
| $(W/L)_7:(W/L)_8:(W/L)_{16}::2:2:1$ | (9) |
| $(W/L)_9:(W/L)_{10}:(W/L)_{17}::2:2:1$ | (10) |

The width-to-length ratio of MOSFET $Q_{19}$ is chosen to provide responsive to the drain current demand of $Q_{14}$ a voltage drop across $Q_{19}$ channel that affords sufficient operating voltage range for signals at terminals out and $\overline{OUT}$.

FIG. 3 shows non-linear voltage amplifier circuitry that can be used after linear voltage amplifier circuitry to implement each non-linear output driver amplifier $OD_j$ in the FIG. 1 neural net layer. The FIG. 3 non-linear voltage amplifier is a cascade connection of two source-follower transistors, one ($Q_{20A}$) being an n-channel MOSFET and the other ($Q_{20B}$) being a p-channel MOSFET. $Q_{20A}$ is provided a constant-current generator source load by an n-channel MOSFET $Q_{21}$, which is the slave or output transistor of a current mirror amplifier including as its master or input transistor an n-channel MOSFET $Q_{22}$ self-biased by drain-to-gate feedback. $Q_{20B}$ is provided a constant-current generator source load by a p-channel MOSFET $Q_{23}$, which is the slave or output transistor of a current mirror amplifier including as its master or input transistor a p-channel MOSFET $Q_{24}$ self-biased by drain-to-gate feedback. $Q_{22}$ and $Q_{24}$ are connected as diodes by their respective drain-to-gate feedback connections, and these diodes are connected in series with another diode-connected n-channel MOSFET $Q_{25}$ and with another diode-connected p-channel MOSFET $Q_{26}$ between $V_{SS}$ and $V_{DD}$ potentials to implement a bias network. In this bias network a quiescent input current flows from the input port of the current mirror amplifier comprising $Q_{23}$, $Q_{24}$ into the input port of the current mirror amplifier comprising $Q_{21}$, $Q_{22}$. $Q_{21}$ and $Q_{23}$ drain current flows are similar-valued by current mirror amplifier action.

All the n-channel MOSFETs $Q_{20A}$, $Q_{21}$, $Q_{22}$ and $Q_{25}$ have similar channel widths and lengths and exhibit similar operating characteristics. All the p-channel MOSFETs $Q_{20B}$, $Q_{23}$, $Q_{24}$ and $Q_{26}$ have similar channel widths and lengths and exhibit similar operating characteristics, which are complementary to those of the n-channel MOSFETs. The bias network MOSFETs $Q_{22}$, $Q_{24}$, $Q_{25}$ and $Q_{26}$ may be shared by a plurality of the FIG. 3 non-linear voltage amplifier circuits to conserve hardware and operating power.

Non-linearity of response in the FIG. 3 voltage amplifier comes about because (1) source-follower action of $Q_{20A}$ for positive-going excursions of its gate electrode potential becomes limited as its source potential approaches its drain potential $V_{HI}$ and (2) source-follower action of $Q_{20}$ for negative-going excursions of its gate electrode potential becomes limited as its source potential approaches its drain potential $V_{LO}$. At the source electrode of source-follower $Q_{20B}$ there is a sigmoidal response to a linear ramp potential applied to the gate electrode of source-follower $Q_{20A}$. The voltages $V_{LO}$ and $V_{HI}$ can be programmed to control the limiting properties of the FIG. 3 non-linear amplifier, and the voltages $V_{LO}$ and $V_{HI}$ may be selected to provide for symmetry of response or for asymmetry of response. FIG. 3 shows representative values for $V_{HI}$ and $V_{LO}$ that provide a substantially symmetrical response about +2.5 volts.

Output driver amplifier $OD_j$ can use non-linear voltage amplifier circuitry different from that shown in FIG. 3. For example, source followers $Q_{20A}$ and $Q_{20B}$ can be reversed in order of their cascade connection. Either this alternative circuitry or the FIG. 3 circuitry can be preceded by a charge-sensing amplifier, rather than a linear voltage amplifier, to realize the type of output driver amplifier used in FIG. 4 and FIG. 9 neural nets. In the FIG. 1 neural net the output driver amplifiers can be realized without using the FIG. 3 circuitry or the previously described alternative circuitry. For example, each output driver amplifier can comprise a long-tailed pair connection of transistors having a current mirror amplifier load for converting their output signal voltage to single-ended form. The long-tailed pair connection of transistors is a differential amplifier connection where their source electrodes have a differential-mode connection to each other and to a constant-current generator.

Consider now how neuron model behavior is exhibited by input driver amplifier $ID_i$, capacitors $C_{i,j}$ and $C_{i,(j+N)}$, and non-linear output driver amplifier $OD_j$ for particular respective values of i and j. If the capacitance of capacitor $C_{i,j}$ is larger than the capacitance of capacitor $C_{i,(j+N)}$ for these particular values of i and j, then the output voltage $y_j$ for that j will exhibit "excitory" response to the input voltage $x_i$. If the capacitances of $C_{i,j}$ and $C_{i,(j+N)}$ are equal for these i and j values, then the output voltage $y_j$ for that j should exhibit no response to the input voltage $y_j$. If the capacitance of capacitor $C_{i,j}$ is smaller than the capacitance of capacitor $C_{i(j+N)}$ for those i and j values, then the output voltage $y_j$ for that j will exhibit "inhibitory" response to the input voltage $x_i$.

In some neural nets constructed in accordance with the invention the capacitors $C_{i,j}$ and $C_{i,(j+N)}$ for all i and j may be fixed-value capacitors, so there is never any alteration in the weighting of input voltages $x_i$ where i=1,... M. However, such neural nets lack the capacity to adapt to changing criteria for neural responses— which adaptation is necessary, for example, in a neural network that is to be connected for self-learning. It is desirable in certain applications, then, to provide for altering the capacitances of each pair of capacitors $C_{i,j}$ and $C_{i,(j+N)}$ associated with a respective pair of values of i and j. This alteration is to be carried out in a complementary way, so the sum of the capacitances of $C_{i,j}$ and of $C_{i(j+N)}$ remains equal to $C_k$. For example, this can be implemented along the lines of the inventor's previous teachings in regard to "digital" capacitors, having capacitances controlled in proportion to binary-numbers used as control signals, as particularly disclosed in connection with FIG. 11 of his U.S. Pat. No. 3,890,635 issued Jun. 17, 1975, entitled "VARIABLE CAPACITANCE SEMICONDUCTOR DEVICES" and assigned to General Electric Company. Each pair of capacitors $C_{i,j}$ and $C_{i,j+N}$ is then two similar ones of these capacitors and their capacitances are controlled by respective control signals, one of which is the one's complement of the other.

Alternatively, the pair of capacitors $C_{i,j}$ and $C_{i,(j+N)}$ may be formed from selecting each of a set of component capacitors with capacitances related in accordance with powers of two to be a component of one or the other of the pair of capacitors $C_{i,j}$ and $C_{i(j+N)}$, the selecting being done by field effect transistors (FETs) operated as transmission gates. Yet another way of realizing the pair of capacitors $C_{i,j}$ and $C_{i,(j+N)}$ is to control the inverted surface potentials of a pair of similar size metal-oxide-semiconductor (MOS) capacitors with respective analog signals developed by digital-to-analog conversion.

Figure 4B:
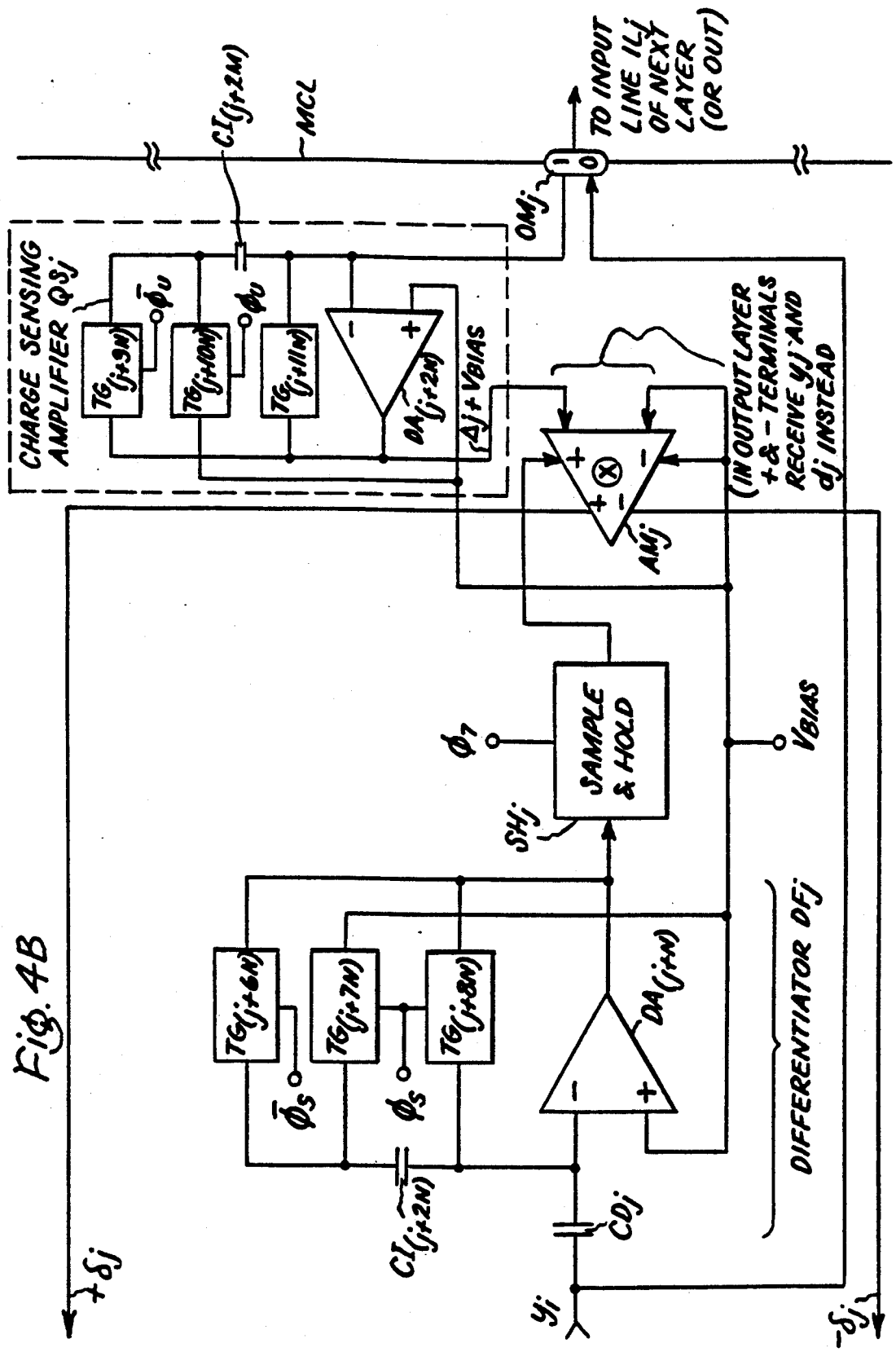
Figure 11:
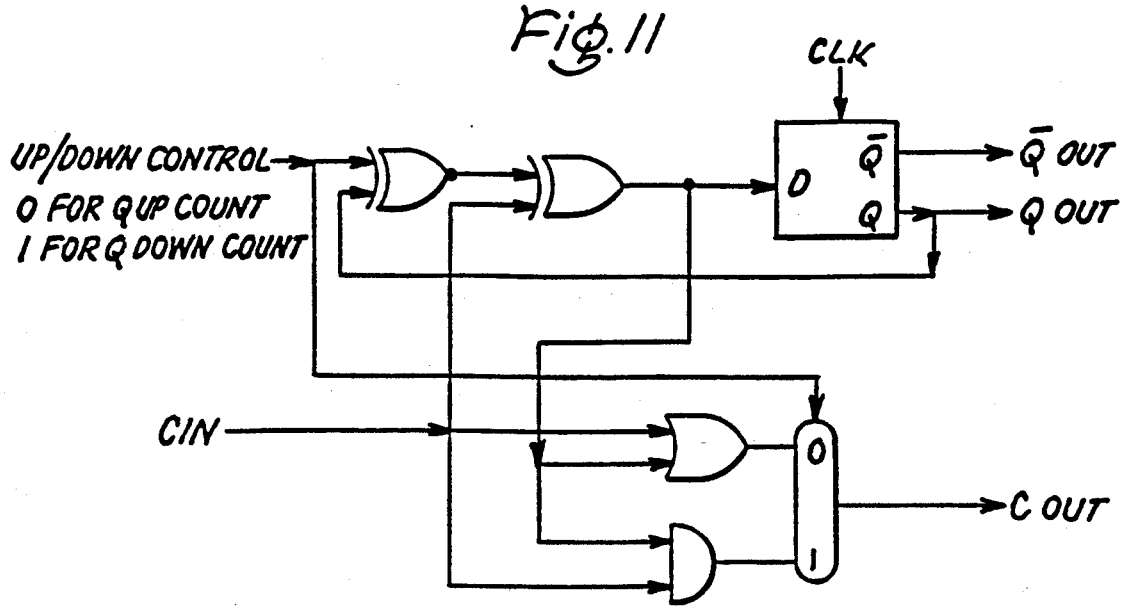
FIG. 11 is a schematic diagram of the logic elements included in each counter stage.

FIG. 4, comprising component FIGS. 4A and 4B, shows a representative modification that can be made to the FIG. 1 neural net near each set of intersections of an output lines $OL_j$ and $OL_{j+N}$ with an input line $IL_i$ from which they receive with differential weighting a synapse input signal $x_i$. Such modifications together make the neural net capable of being trained. Each capacitor pair $C_{i,j}$ and $C_{i,(j+N)}$ of the FIG. 1 neural net is to be provided by a pair of digital capacitors $DC_{i,j}$ and $DC_{i,(j+N)}$. (For example, each of these capacitors $DC_{i,j}$ and $DC_{i,(j+N)}$ may be as shown in FIG. 11 of U.S. Pat. No. 3,890,635). The capacitances of $DC_{i,j}$ and $DC_{i,(j+N)}$ are controlled in complementary ways by a digital word and its one's complement, as drawn from a respective word-storage element $WSE_{i,j}$ in an array of such elements located interstitially among the rows of digital capacitors and connected to form a memory. This memory may, for example, be a random access memory (RAM) with each word-storage element $WSE_{i,j}$ being selectively addressable by row and column address lines controlled by address decoders. Or, by way of further example, this memory can be a plurality of static shift registers, one for each column j. Each static shift register will then have a respective stage $WSE_{i,j}$ for storing the word that controls the capacitances of each pair of digital capacitors $DC_{i,j}$ and $DC_{i,(j+N)}$.

The word stored in word storage element $WSE_{i,j}$ may also control the capacitances of a further pair of digital capacitors $DC_{(i+M),j}$ and $DC_{(i+M),(j+N)}$, respectively. The capacitors $DC_{(i+M),j}$ and $DC_{(i+M),(j+N)}$ connect between "ac ground" and output lines $OL_j$ and $OL_{(j+N)}$, respectively, and form parts of the loading capacitors $CL_{(M+j)}$. The capacitances of $DC_{(i+2M,j)}$ and $DC_{i,j}$ are similar to each other and changes in their respective values track each other. The capacitances of $DC_{(i+M),(j+N)}$ and $DC_{i,(j+N)}$ are similar to each other and changes in their respective values track each other. The four digital capacitors $DC_{i,j}$, $DC_{i,(j+N)}$, $DC_{(i+M),j}$ and $DC_{(ik+M),(j+N)}$ are connected in a bridge configuration having input terminals connecting from the input line $IL_i$ and from a-c ground respectively and having output terminals connecting to output lines $OL_j$ and $OL_{(j+N)}$ respectively. This bridge configuration facilitates making computations associated with back-propagation programming by helping make the capacitance network bilateral insofar as voltage gain is concerned. Alternatively, where the computations for back-propagation programming are done by computers that do not involve the neural net in the computation procedures, the neural net need not include the digital capacitors $DC_{(i+M),j}$ and $DC_{(i+M),(j+N)}$.

When the FIG. 4 neural net is being operated normally, following programming, the $\phi_P$ signal applied to a mode control line MCL is a logic ZERO. This ZERO on mode control line MCL conditions each output line multiplexer $OLM_j$ of an N-numbered plurality thereof to select the output line $OL_j$ to the inverting input terminal of a respective associated fully differential amplifier $DA_j$. This ZERO on mode control line MCL also conditions each output line multiplexer $OLM_{(j+N)}$ to select the output line $OL_{(j+N)}$ to the non-inverting input terminal of the respective associated fully differential amplifier $DA_j$. Differential amplifier $DA_j$, which may be of the form shown in FIG. 2, is included in a respective charge-sensing amplifier $QS_j$ that performs a charge-sensing operation for output line $OL_j$. In furtherance of this charge-sensing operation, a transmission gate $TG_j$ responds to the absence of a reset pulse $Q_R$ to connect an integrating capacitor $CI_j$ between the (+) output and (−) input terminals of amplifier $DA_j$; and a transmission gate $TG_{(j+5N)}$ responds to the absence of the reset pulse $\phi_R$ to connect an integrating capacitor $CI_{(j+N)}$ between the (−) output and (+) input terminals of amplifier $DA_j$. With integrating capacitors $CI_j$ and $CI_{(j+N)}$ so connected, amplifier $DA_j$ functions as a differential charge amplifier. When $\phi_p$ signal on mode control line MCL is a ZERO, the input signal $x_i$ induces a total differential change in charge on the capacitors $DC_{i,j}$ and $DC_{i,(j+N)}$ proportional to the difference in their respective capacitances. The resulting displacement current flows needed to keep the input terminals of differential amplifier $DA_j$ substantially equal in potential requires that there be corresponding displacement current flow from the integrating capacitor $CI_j$ and $CI_{(j+N)}$ differentially charging those charging capacitors to place thereacross a differential voltage $v_j$ defined as follows.

$$v_j = (CI_j + CI_{(j+N)})^{-1} \sum_{i=1}^{M} (C_{i,j} - C_{(i+M),j}) x_i \quad (11)$$

The half $V_j$ signal from the non-inverting (+) output terminal of amplifier $DA_j$ is supplied to a non-linear voltage amplifier circuit $NL_j$ which can be the non-linear voltage amplifier circuit of FIG. 3 or an alternative circuit as previously described. If the alternative non-linear voltage amplifier circuit is one adapted for receiving push-pull input voltages, such as the non-linear long-tailed pair connection of transistors supplying a balanced-to-single-ended converter previously alluded to, it may receive both the $+v_j$ and $-v_j$ output voltages from the differential charge-sensing amplifier $DSQ_j$ as its push-pull input voltages. The FIG. 3 non-linear voltage amplifier circuit does not require the $-v_j$ output voltage from the differential charge-sensing amplifier $DSQ_j$ as an input voltage, so this output of the differential charge-sensing amplifier $DSQ_j$ is shown in FIG. 4A as being left unconnected to further circuitry. The non-linear voltage amplifier circuit $NL_j$ responds to generate the axon output response $y_j$. It is presumed that this non-linear voltage amplifier $NL_j$ supplies $y_j$ at a relatively low source impedance as compared to the input impedance offered by the circuit $y_j$ is to be supplied to—e.g. on input line in a succeeding neural net layer. If this is so there is no need in a succeeding neural net layer to interpose an input driver amplifier $ID_i$ as shown in FIG. 1. This facilitates interconnections between successive neural net layers being bilateral. An output line multiplexer $OLM_j$ responds to the $\phi_P$ signal appearing on the mode control line MCL being ZERO to apply $y_j$ to an input line of a succeeding neural net layer if the elements shown in FIG. 4 are in a hidden layer. If the elements shown in FIG. 4 are in the output neural net layer, output line multiplexer $OLM_j$ responds to the $\phi_P$ signal on the mode control line being ZERO to apply $y_j$ to an output terminal for the neural net.

From time to time, the normal operation of the neural net is interrupted; and, to implement dc-restoration a reset pulse $\phi_R$ is supplied to the charge sensing amplifier $QS_j$. Responsive to $\overline{\phi_R}$, the logic complement of the reset pulse $\phi_R$, going low when $\phi_R$ goes high, transmission gates $TG_j$ and $TG_{(j+5N)}$ are no longer rendered conductive to connect the integrating capacitors $CI_j$ and $CI_{(j+N)}$ from the output terminals of differential amplifier $Da_j$. Instead, transmission gates $TG_{(j+N)}$ and $TG_{(j+4N)}$ respond to $\phi_R$ going high to connect to $V_{BIAS}$ the plates of capacitor $CI_j$ and $CI_{(j+N)}$ normally connected from those output terminals, $V_{BIAS}$ being the 2.5 volt intermediate potential between the $V_{SS}=0$ volt and $V_{DD}=5$ volt operating voltages of differential amplifier $Da_j$. Other transmission gates $TG_{(j+2N)}$ and $TG_{(J+3N)}$ respond to $\phi_R$ going high to apply direct-coupled degenerative feedback from the output terminal of differential amplifier $DA_j$ to its input terminals, to bring the voltage at the output terminals to that supplied to its inverting input terminal from output lines $OL_j$ and $OL_{(j+N)}$. During the dc-restoration all $x_i$ are "zero-valued". So the charges on integrating capacitor $CI_j$ and $CI_{(j+N)}$ are adjusted to compensate for any differential direct voltage error occurring in the circuitry up to the output terminals of differential amplifier $Da_j$. Dc-restoration is done concurrently for all differential amplifiers $DA_j$ (i.e., for values of j ranging from one to N).

During training, the $\phi_P$ signal applied to mode control line MCL is a logic ONE, which causes the output line multiplexer $OLM_j$ to disconnect the output lines $OL_j$ and $OL_{(j+N)}$ from the (+) and (−) input terminals of differential amplifier $DA_j$ and to connect the output lines $OL_j$ and $OL_{(j+N)}$ to receive $+\delta_j$ and $-\delta_j$ error terms. These $+\delta_j$ and $-\delta_j$ error terms are generated as the balanced product output signal of a analog multiplier $AM_j$, responsive to a signal $\Delta_j$ and to a signal $y'_j$ which is the change in output voltage $y_j$ of non-linear amplifier $NL_j$ for unit change in the voltage on output line $OL_j$. The term $\Delta_j$ for the output neural net layer is an error signal that is the difference between $y_j$ actual value and its desired value $d_j$. The term $\Delta_j$ for a hidden neural net layer is also an error signal, which is of a nature that will be explained in detail further on in this specification.

Differentiator $DF_j$ generates the signal $y'_j$, which is a derivative indicative of the slope of $y_j$ change in voltage on output line $OL_j$, superposed on $V_{BIAS}$. To determine the $y'_j$ derivative, a pulse doublet comprising a small positive-going pulse immediately followed by a similar-amplitude negative-going pulse is introduced at the inverting input terminal of differential amplifier $DA_j$ (or equivalently, the opposite-polarity doublet pulse is introduced at the non-inverting input terminal of differential amplifier $DA_j$) to first lower $y_j$ slightly below normal value and then raise it slightly above normal value. This transition of $y_j$ from slightly below normal value to slightly above normal value is applied via a differentiating capacitor $CD_j$ to differentiator $DF_j$.

Differentiator $DF_j$ includes a charge sensing amplifier including a differential amplifier $DA_{(j+N)}$ and an integrating capacitor $CI_{(j+N)}$. During the time $y_j$ that is slightly below normal value, a reset pulse $\phi_S$ is applied to transmission gates $TG_{(j+4N)}$ and $TG_{(j+5N)}$ to render them conductive. This is done to drain charge from integrating capacitor $CI_{(j+N)}$, except for that charge needed to compensate for $DA_{(j+N)}$ input offset voltage error. The reset pulse $\phi_S$ ends, rendering transmission gates $TGB_{(j+4N)}$ and $TG_{(j+5N)}$ no longer conductive, and the complementary signal $\overline{\phi_S}$ goes high to render a transmission gate $TG_{(j+3N)}$ conductive for connecting integrating capacitor $CI_{(j+N)}$ between the output and inverting-input terminals of differential amplifier $DA_{(j+N)}$.

With the charge-sensing amplifier Comprising elements $DA_{(j+N)}$ and $CI_{(j+N)}$ reset, the small downward pulsing of $y_j$ from normal value is discontinued and the small upward pulsing of $y_j$ from normal value occurs. The transition between the two abnormal conditions of $y_j$ is applied to the charge-sensing amplifier by electrostatic induction via differentiating capacitor $CD_j$. Differential amplifier $DA_{(j+N)}$ output voltage changes by an amount $y'_j$ from the $V_{BIAS}$ value it assumed during reset. The use of the transition between the two pulses of the doublet, rather than the edge of a singlet pulse, to determine the derivative $y'_j$ makes the derivative-taking process treat more similarly those excitory and inhibiting responses of the same amplitude. The doublet pulse introduces no direct potential offset error into the neural net layer.

Responsive to a pulse $\phi_T$, the value $y'_{j+VBIAS}$ from differentiator $DF_j$ is sampled and held by row sample and hold circuit $RSH_j$ for application to analog multiplier $AM_j$ as an input signal. This sample and hold procedure allows $y_j$ to return to its normal value, which is useful in the output layer to facilitate providing $y_j$ for calculating $(y_j-d_j)$. The sample and hold circuit $RSH_j$ may simply comprise an L-section with a series-arm transmission-gate sample switch and a shunt-leg hold capacitor, for example. Analog multiplier $AM_j$ is of a type accepting differential input signals, as will be described in greater detail further on in connection with FIG. 6. The difference between $y'_j+V_{BIAS}$ and $V_{BIAS}$ voltages is used as a differential input signal to analog multiplier $AM_j$, which exhibits common-mode rejection for the $V_{BIAS}$ term.

During training, the $\phi_P$ signal applied to mode control line MCL is a logic ONE, as previously noted. When the FIG. 4 elements are in the output layer, the ONE on mode control line MCL conditions an output multiplexer $OM_j$ to discontinue the application of $y_j$ signal from non-linear amplifier $NL_j$ to an output terminal. Instead, the output multiplexer $OM_j$ connects the output terminal to a charge-sensing amplifier $QS_j$. Charge sensing amplifier $QS_j$ includes a differential amplifier $DA_{(j+2N)}$ and an integrating capacitor $CI_{(j+2N)}$ and is periodically reset responsive to a reset pulse $\phi_U$. Reset pulse $\phi_U$ can occur simultaneously with reset pulse $\phi_S$, for example. Output signal $\Delta_j$ from charge-sensing amplifier $QS_j$ is not used in the output layer, however. Analog multiplier $AM_j$ does not use $\Delta_j+V_{BIAS}$ and $V_{BIAS}$ as a differential input signal in the output layer, $(y_j-d_j)$ being used instead.

When the FIG. 4 elements are in a hidden neural net layer, $\phi_P$ signal on the mode control line MCL being a ONE conditions output multiplexer $OM_j$ to discontinue the application of $y_j$ signal from non-linear amplifier $NL_j$ to the input line $IL_j$ of the next neural net layer. Instead, output multiplexer $OM_j$ connects the input line $IL_j$ to a charge-sensing amplifier $QS_j$. Charge-sensing amplifier $QS_j$ senses change in the charge on input line $IL_j$ during training to develop a $\Delta_j$ error signal superposed on $V_{BIAS}$ direct potential. The difference between $\Delta_j+V_{BIAS}$ and $V_{BIAS}$ voltages is used as a differential input signal to analog multiplier $AM_j$, which multiplier exhibits common-mode rejection for the $V_{BIAS}$ term.

Charge-sensing amplifier $QS_j$ employs a differential-input amplifier $DA_{(j+2N)}$ and an integrating capacitor $CI_{(j+2N)}$. Transmission gates $TG_{(j+9N)}$, $TG_{(j+10N)}$ and $TG_{(j+11N)}$ cooperate to provide occasional resetting of charge conditions on the integrating capacitor $CI_{j+2N}$ responsive to the reset pulse $\phi_U$.

Figure 5:
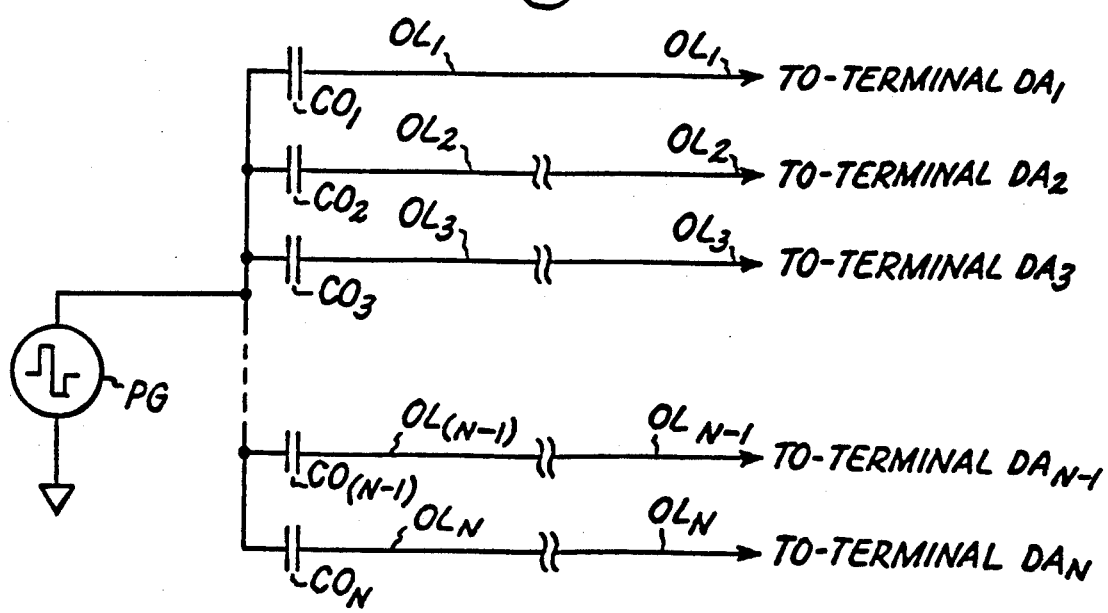
FIG. 5 is a schematic diagram illustrating one way of pulsing the non-linear output driver amplifiers in a FIG. 1 neural net layer modified manifoldly per FIG. 4.

FIG. 5 shows how each output line $OL_j$ for $j=1,\ldots N$ may be pulsed during calculation of $y'_j$ terms. Each output line $OL_j$ is connected by a respective capacitor $CO_j$ to the output terminal of a pulse generator PG, which generates the doublet pulse. FIG. 5 shows the doublet pulse applied to the end of each output line $OL_j$ remote from the—terminal of the associated differential amplifier $DA_j$ in the charge-sensing amplifier $QS_j$ sensing the charge on that line. It is also possible to apply the doublet pulses more directly to those—terminals by connecting to these terminals respective ones of the plates of capacitors $CO_j$ that are remote from the plates connecting to pulse generator PG.

Each output line $OL_j$ has a respective capacitor $CO_j$ connected between it and a point of reference potential, and each output line $OL_{(j+N)}$ has a respective capacitor $CO_{(j+N)}$ connected between it and a point of reference potential, which capacitors are not shown in the drawing. The respective capacitances of the capacitors $CO_j$ and $CO_{(j+N)}$ are all of the same value, so that the back-propagation algorithm is not affected by the presence of these capacitors. Arrangements for adding the doublet pulse to $v_j$ before its application to the non-linear amplifier $NL_j$ can be used, rather than using the FIG. 5 arrangement.

Figure 6:
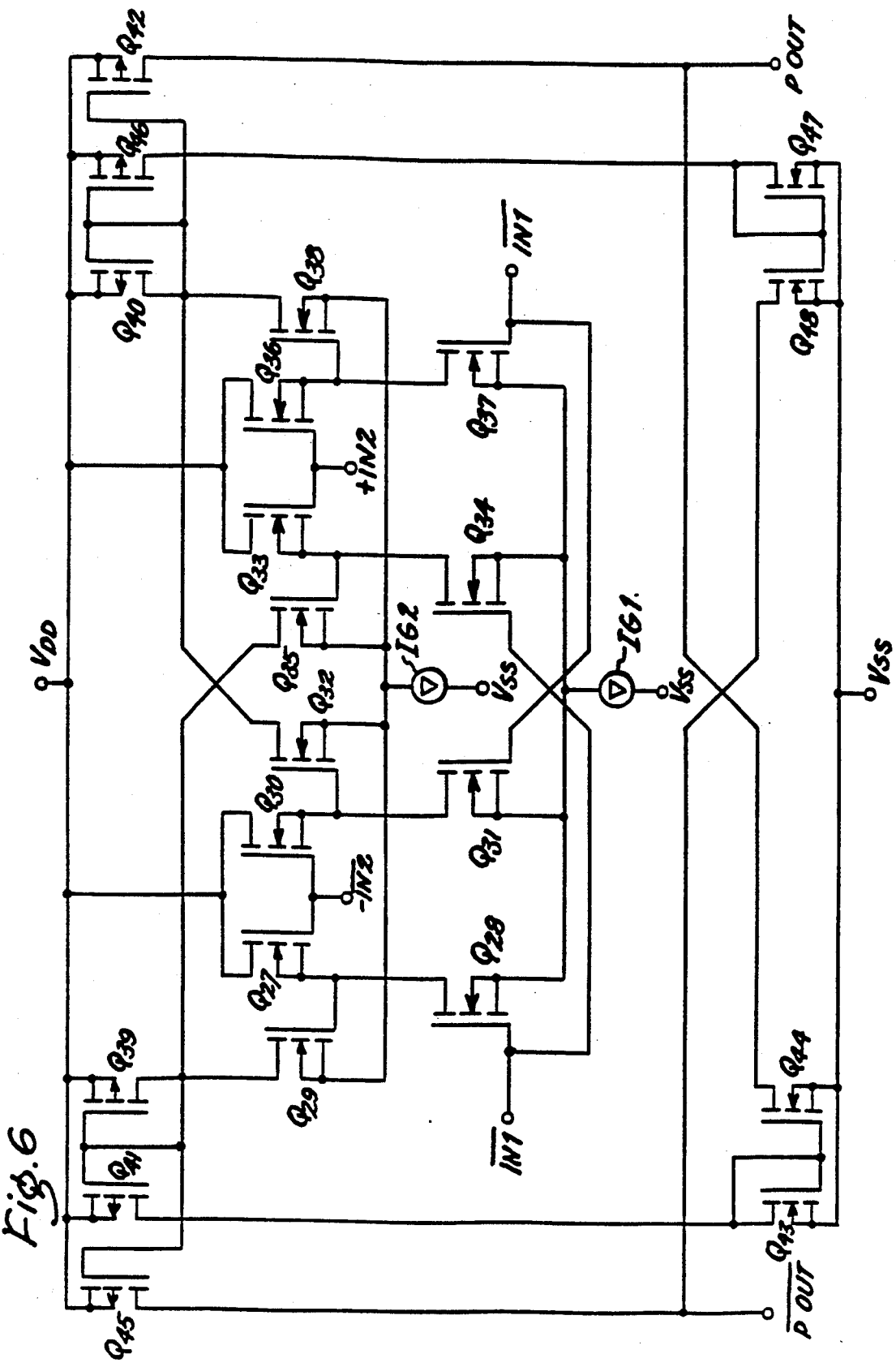
FIG. 6 is a schematic diagram of a prior-art analog multiplier modified to provide balanced output signals, which is useful in the FIG. 1 neural net modifications shown in FIG. 4 and in FIG. 9.

FIG. 6 shows a four-quadrant analog multiplier supplying product output signal in balanced form at its output terminals POUT and $\overline{POUT}$. It is a modification of a single-ended-output analog multiplier described by K. Bultt and H. Wallinga in their paper "A CMOS Four-quadrant Analog Multiplier" appearing on pages 430-435 of the *IEEE JOURNAL OF SOLID STATE CIRCUITS*, Vol. SC-21, No. 3, June. 1986, incorporated herein by reference. The FIG. 6 analog multiplier accepts a first push-pull input signal between input terminals and $\overline{IN1}$ and IN1, and it accepts a second push-pull input signal between terminals $\overline{IN2}$ and IN2.

As described by Bultt and Wallinga there are four component analog multipliers: a first comprising n-channel MOSFETs $Q_{27}$-$Q_{29}$, a second comprising n-channel MOSFETs $Q_{30}$-$Q_{32}$, a third comprising n-channel MOSFETs $Q_{33}Q_{35}$ and a fourth comprises n-channel MOSFETs $Q_{36}$-$Q_{38}$. The component analog multipliers are arranged in cross-coupled pairs to suppress quadratic and offset terms. Constant-current generator IGI provides for floating of the potentials at input terminals $\overline{IN1}$ and IN1, and constant-current generator IG2 provides for floating of the potentials at input terminals $\overline{IN2}$ and IN2. The push-pull outputs of the four-quadrant analog multiplier are supplied to diode-connected p-channel MOSFETs $Q_{39}$ and $Q_{40}$, which are the master or input transistors of respective current mirror amplifiers., $Q_{39}$ and $Q_{40}$ have respective p-channel MOS slave or output transistors $Q_{41}$ and $Q_{42}$ associated with them in their respective current mirror amplifiers, and as in the Bultt and Wallinga analog multiplier the push-pull variations in the drain currents of $Q_{41}$ and $Q_{42}$ are converted to single-ended form at output terminal POUT using a current mirror amplifier connection of n-channel MOSFETs $Q_{43}$ and $Q_{44}$. In FIG. 6 $Q_{39}$ and $Q_{40}$ additionally have respective further p-channel MOS slave or output transistors $Q_{45}$ and $Q_{46}$ associated with them in their respective current mirror amplifiers, which are dual-output rather than single-output in nature. The push-pull variations in the drain currents of $Q_{45}$ and $Q_{46}$ are converted to single-ended form at terminal $\overline{POUT}$ using a current mirror amplifier connection of n-channel MOSFETs $Q_{47}$ and $Q_{48}$. Since the current mirror amplifier connections of $Q_{43}$ and $Q_{47}$ are driven push-pull, the output signals at output terminals POUT and $\overline{POUT}$ exhibit variations in opposite senses of swing.

Figure 7:
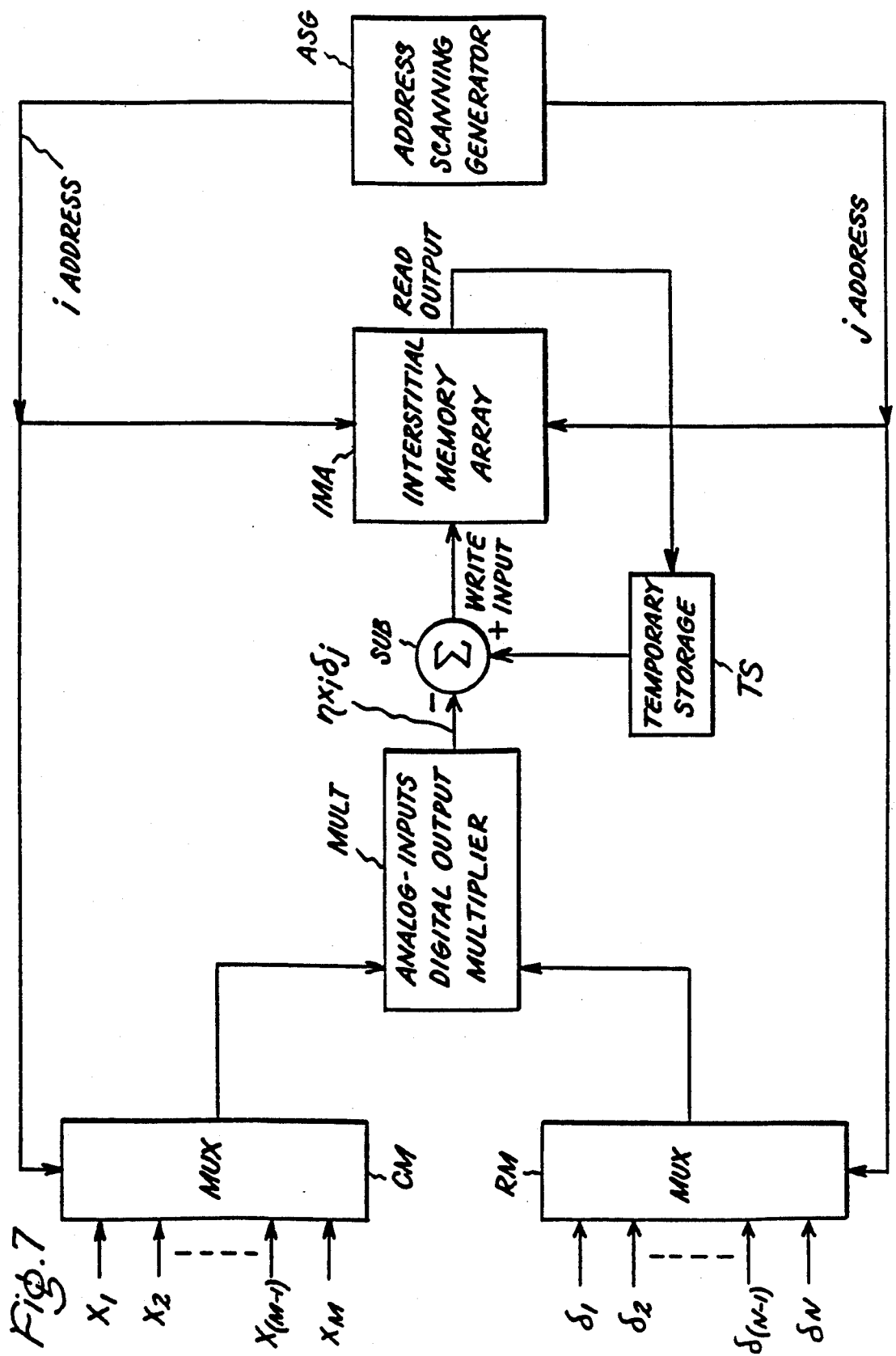
FIG. 7 is a schematic diagram of training apparatus used with the FIG. 1 neural net layer manifoldly modified per FIG. 4.

FIG. 7 shows apparatuses for completing the back-propagation computations, as may be used with the FIG. 1 neural net manifoldly modified per FIG. 4. The weights at each word storage element $WSE_{i,j}$ in the interstitial memory array IMA are to be adjusted as the i column addresses and j row addresses are scanned row by row, one column at a time. An address scanning generator ASG generates this scan of i and j addresses shown applied to interstitial memory array IMA, assuming it to be a random access memory. The row address j is applied to a row multiplexer RM that selects $\delta_j$ to one input of a multiplier MULT, and the column address i is applied to a column multiplexer CM that selects $x_i$ to another input of the multiplier MULT.

Multiplier MULT is of a type providing a digital output responsive to the product of its analog input signals. Multiplier MULT may be a multiplying analog-to-digital converter, or it may comprise an analog multiplier followed by an analog-to-digital converter, or it may comprise an analog-to-digital converter for each of its input signals and a digital multiplier for multiplying together the converted signals. Multiplier MULT generates the product $x_i \delta_j$ as reduced by a scaling factor $\eta$, which is the increment or decrement to the weight stored in the currently addressed word storage element $WSE_{ij}$ in the memory array IMA. The former value of weight stored in word storage element $WSE_{ij}$ is read from memory array IMA to a temporary storage element, or latch, TS. This former weight value is supplied as minuend to a digital subtractor SUB, which receives as subtrahend $\eta x_i \delta_j$ from multiplier MULT. The resulting difference is the updated weight value which is written into word storage element $WSE_{i,j}$ in memory array IMA to replace the former weight value.

Figure 8:
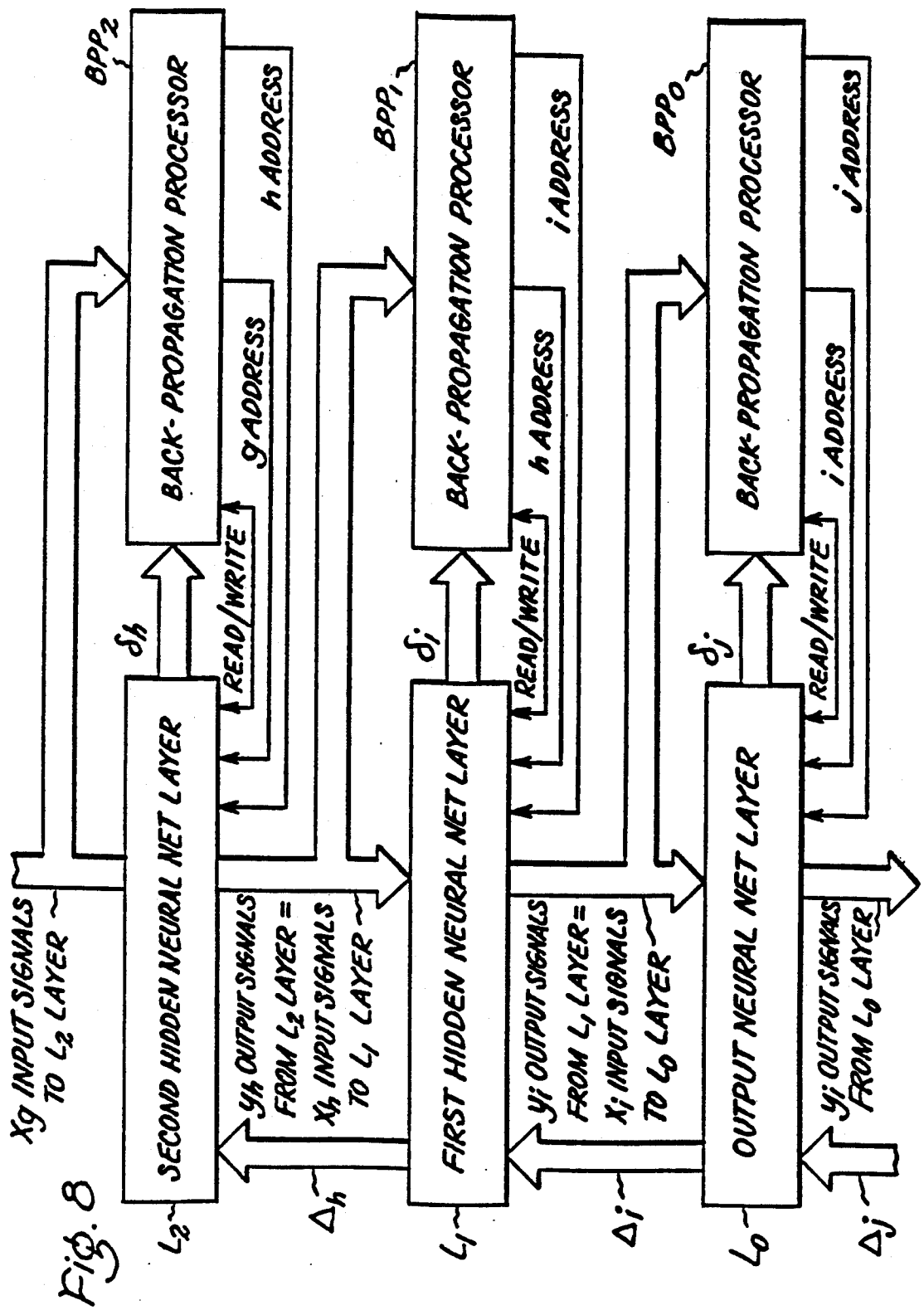
FIG. 8 is a schematic diagram of a system having a plurality of neural net layers each constructed in accordance with FIG. 1 modified manifold times per FIG. 4.

FIG. 8 shows how trained neural net layers $L_0$, $L_1$ and $L_2$ are connected together in a system that can be trained. $L_0$ is the output neural net layer that generates $y_j$ output signals, is similar to that described in connection with FIGS. 4 and 5, and is provided with a back-propagation processor $BPP_0$ with elements similar to those shown in FIG. 7 for updating the weights stored in the interstitial memory array of $L_0$. $L_1$ is the first hidden neural net layer which generates $y_i$ output signals supplied to the output neural net layer as its $x_i$ input signals. These $y_i$ output signals are generated by layer $L_1$ as its non-linear response to the weighted sum of its $x_h$ input signals. This first hidden neural net layer $L_1$ is provided with a back-propagation processor $BPP_1$ similar to $BPP_0$. $L_2$ is the second hidden neural net layer, which generates $y_h$ output signals supplied to the first hidden neural net layer as its $x_h$ input signals. These $y_h$ output signals are generated by layer $L_2$ as its non-linear response to a weighted summation of its $x_g$ input signals. This second hidden layer is provided with a back-propagation processor similar to $BPP_0$ and to $BPP_1$.

FIG. 8 presumes that the respective interstitial memory array IMA of each neural net layer $L_0$, $L_1$, $L_2$ has a combined read/write bus instead of separate read input and write output busses as shown in FIG. 7. FIG. 8 shows the $\Delta_j$, $\Delta_i$ and $\Delta_h$ signals being fed back over paths separate from the feed forward paths for $y_j$, $y_i$ and $y_h$ signals, which separate paths are shown to simplify conceptualization of the neural net by the reader. In actuality, as shown in FIGS. 4 and 9, a single path may be used to transmit $y_j$ in the forward direction and $\Delta_j$ in the reverse direction, etc. Back-propagation processor $BPP_0$ modifies the weights read from word storage elements in neural net layer $L_0$ interstitial memory array by $\eta x_i \delta_j$ amounts and writes them back to the word storage elements in a sequence of read-modify-write cycles during the training procedure. Back-propagation processor $BPP_1$ modifies the weights read from word storage elements in neural net layer $L_1$ interstitial memory array by $\eta x_h \delta_i$ amounts and writes them back to the word storage elements in a sequence of read-modify-write cycles, during the training procedure. Back-propagation processor $BPP_2$ modifies the weights read and storage elements in neural net layer $L_2$ interstitial memory array by $\eta x_g \delta_h$ amounts and writes them back to the word storage element in a sequence of read-modify-write cycles during the training procedure.

Figure 9A:
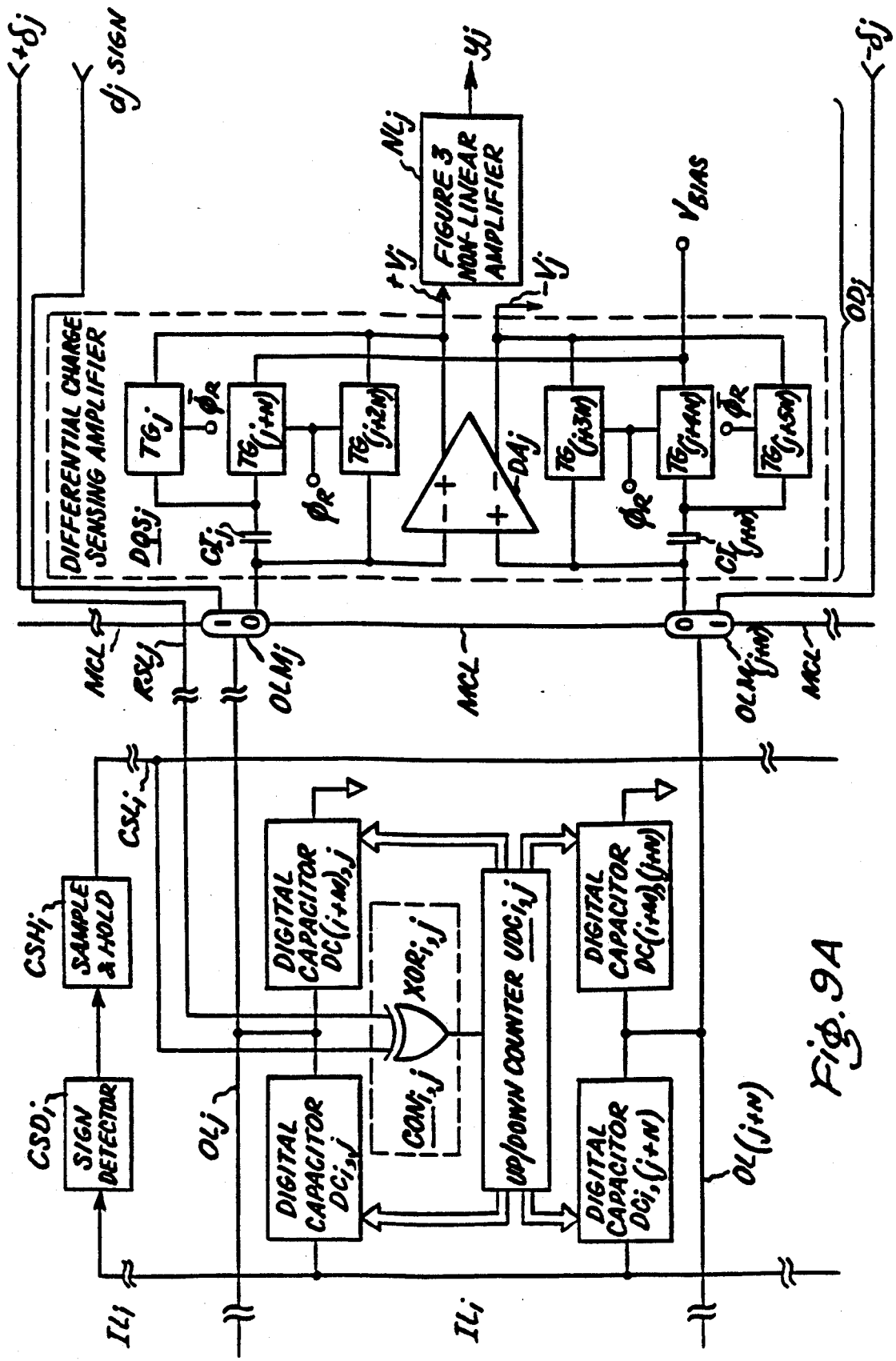
FIGS. 9A and 9B together form a FIG. 9 that is a schematic diagram of an alternative modification of the FIG. 1 neural net that can be made manifold times to provide during training for the programmable weighting of the capacitances used in performing weighted summation of synapse signals, in accordance with another aspect of the invention.
Figure 9B:
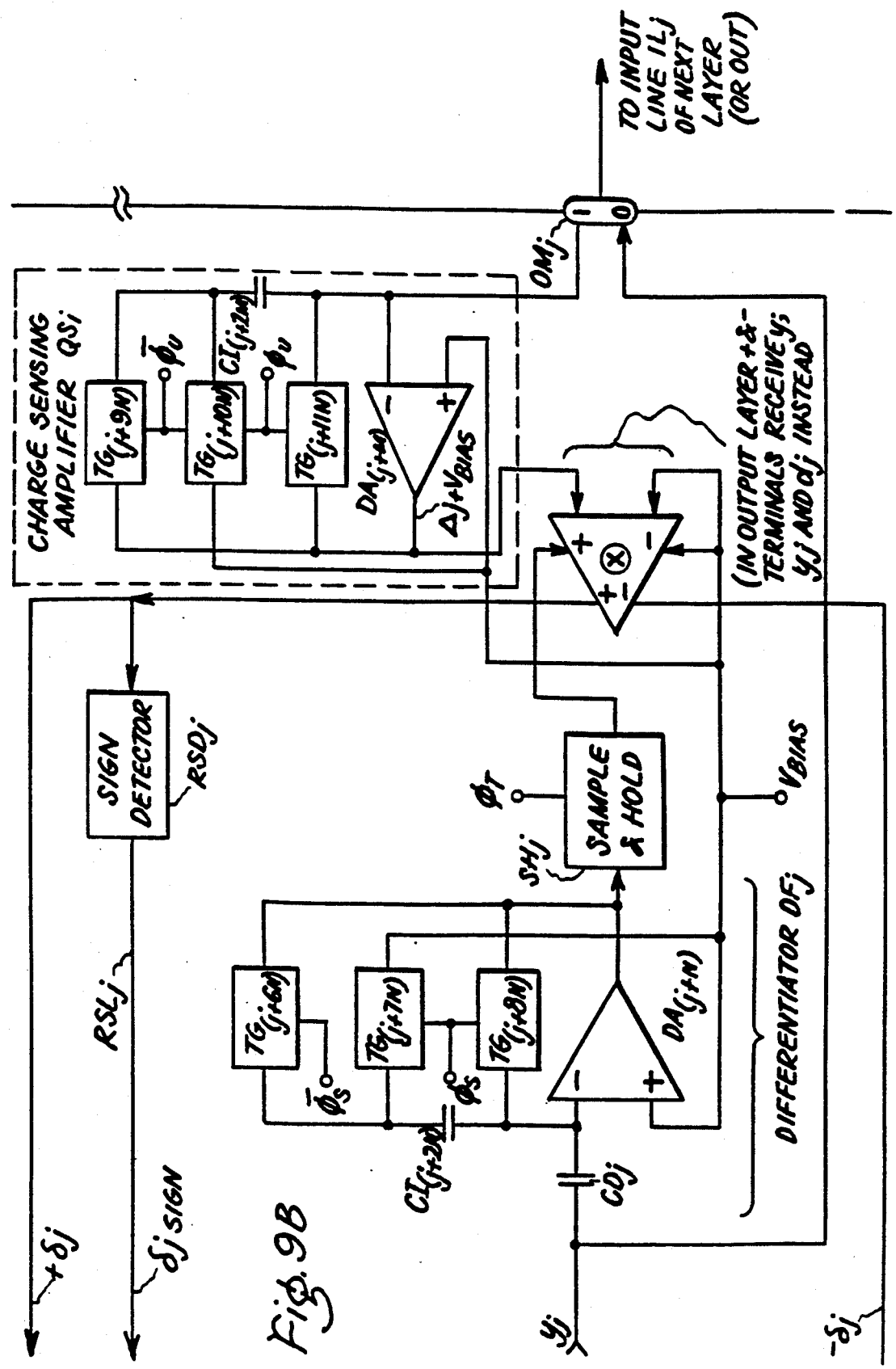

FIG. 9, comprising component FIGS. 9A and 9B shows an alternative modification that can be manifoldly made to the FIG. 1 neural net layer to give it training capability. This alternative modification seeks to avoid the need for a high-resolution multiplier MULT and complex addressing during back-propagation calculations in order that training can be implemented. A respective up/down counter $UDC_{i,j}$ is used instead of each word storage element $WSE_{i,j}$. Correction of the word stored in counter $UDC_{i,j}$ is done a count at a time; and the counter preferably has at least one higher resolution stage in addition to those used to control the capacitances of digital capacitors $DC_{i,j}$, $DC_{(i+M),j}$, $DC_{i,(j+N)}$ and $DC_{(i+M),(j+N)}$. Each up/down counter $UDC_{i,j}$ has a respective counter control circuit $CON_{i,j}$ associated therewith. Each counter control circuit $CON_{i,j}$ may, as shown in FIG. 9a, and described in detail further on in this specification simply consist of an exclusive-OR gate $XOR_{i,j}$.

A row sign detector $RSD_j$ detects whether the polarity of $\delta_j$ is positive or negative, indicative of whether a row of weights should in general be decremented or incremented, and broadcasts its detection result via a row sign line $RSL_j$ to all counter control circuits ($CON_{i,j}$ for $i = 1, \ldots, M$) in the row j associated with that row sign detector $RSD_j$. Before making a back-propagation calculation, a respective column sign detector $CSD_i$ detects whether the polarity of $x_i$ is positive or negative for each columnar position along the row which is to be updated, to provide an indication of whether it is likely the associated weight should be decremented or incremented. This indication is stored temporarily in a (column) sample and hold circuit $CSH_i$. Each column sample and hold circuit $CSH_i$ is connected to broadcast its estimate via a column sign line $CSL_i$ to all counter control circuits ($CON_{i,j}$ for $j=1, \ldots N$) in the column i associated with that sample and hold circuit $CSH_i$. Responsive to these indications from sign detectors $CSD_i$ and $RSD_j$, each respective counter control circuit $CON_{i,j}$ decides in which direction up-/down counter $UDC_{i,j}$ will count to adjust the weight control signals $D_{i,j}$ and $\overline{D}_{i,j}$ stored therein The counter control circuitry $CON_{i,j}$ should respond to the sign of $+\delta_j$ being positive, indicating the response $v_j$ to be too positive, to decrease the capacitance to output line $OL_j$ that is associated with the signal $x_i$ or $-x_i$ that is positive and to increase the capacitance to output line $OL_j$ that is associated with the signal $-x_i$ or $x_i$ that is negative, for each value of i. The counter control circuitry $CON_{i,j}$ should respond to the sign of $+\delta_j$ being negative, indicating the response v to be too negative, to increase the capacitance to output line $OL_j$ that is associated with the signal $-x_i$ or $x_i$ that is negative and to decrease the capacitance to output line $OL_j$ that is associated with the signal $x_i$ or $-x_i$ that is positive. Accordingly, counter control circuitry $CON_{i,j}$ may simply consist of a respective exclusive-OR gate $XOR_{i,j}$ as shown in FIG. 9a, if the following presumptions are valid.

Each of the digital capacitors $DC_{i,j}$ and $DC_{(i+M),(j+N)}$ is presumed to increase or decrease its capacitance as $D_{i,j}$ is increased or decreased respectively. Each of the digital capacitors $DC_{(i+M),j}$ and $DC_{i,(j+N)}$ is presumed to increase or decrease its capacitance as $\overline{D}_{i,j}$ is increased or decreased respectively. A ZERO applied as up/down signal to up/down counter $UDC_{i,j}$ is presumed to cause counting down for $D_{i,j}$ and counting up for $\overline{D}_{i,j}$. A ONE applied as up/down signal to up/down counter $UDC_{i,j}$ is presumed to cause counting up for $D_{i,j}$ and counting down for i,j. Column sign detector $CSD_i$ output indication is presumed to be a ZERO when $x_i$ is not negative and to be a ONE when $x_i$ is negative. Row sign detector $RSD_j$ output indication is presumed to be a ZERO when $\delta_j$ is not negative and to be a ONE when $\delta_j$ is negative. Since the condition where $x_i$ or $\delta_j$ is zero-valued is treated as if the zero-valued number were positive, forcing a false correction which is in fact not necessary, and thus usually creating the need for a counter-correction in the next cycle of back-propagation training, there is dither in the correction loops. However, the extra stage or stages of resolution in each up/down counter $UDC_{i,j}$ prevent high-resolution dither in the feedback correction loop affecting the capacitances of $DC_{i,j}$, $DC_{(i+M),j}$, $DC_{i,(j+N)}$ and $DC_{(i+M),(j+N)}$.

Analog multiplier $AM_j$ develops balanced product signals, $+\delta_j$ and $-\delta_j$, that can be supplied to a voltage comparator that serves as the row sign detector $RSD_j$. Alternatively, since the derivative $y'_j$ always has the same sign (normally a positive one), one can use a voltage comparator to compare the voltages supplied to input terminals of analog multiplier $Aam_j$ the other than those which receive $y'_j+V_{BIAS}$ and $V_{BIAS}$ for providing the row sign detector $RSD_j$ its input signal.

Figure 10:
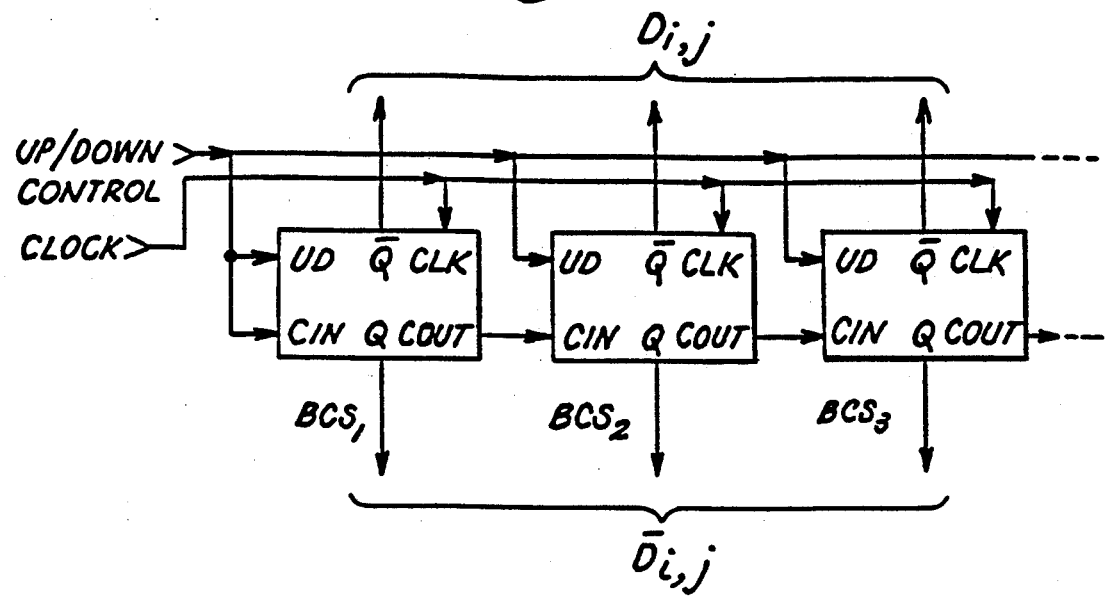
FIG. 10 is a schematic diagram of the arrangement of stages in each counter of the FIG. 1 neural net modified per FIG. 9.

FIG. 10 shows the construction of counter $UDC_{i,j}$ being one that has a plurality of binary counter stages $BCS_1$, $BCS_2$, $BCS_3$ that provide increasingly more significant bits of the weight control signal $D_{i,j}$ and of its one's complement $\overline{D}_{i,j}$. FIG. 11 shows the logic within each binary counter stage which is implemented with MOS circuitry that is conventional in the art. FIGS. 10 and 11 make it clear that the opposite directions of counting for $D_{i,j}$ and $\overline{D}_{i,j}$ can be controlled responsive to a ZERO or ONE up/down control signal in either of two ways, depending on whether $D_{i,j}$ is taken from $\overline{Q}$ outputs of the flip-flops and $\overline{D}_{i,j}$ is taken from their Q outputs, as shown, or whether $D_{i,j}$ is taken from the Q outputs of the flip-flops and $\overline{D}_{i,j}$ is taken from their $\overline{Q}$ outputs. If the latter choice had been made instead, each counter control circuit $CON_{i,j}$ would have to consist of a respective exclusive-NOR circuit, or alternatively the $CSD_i$ and $RSD_j$ sign detectors would have to be of opposite logic types, rather than of same logic type.

Figure 12A:
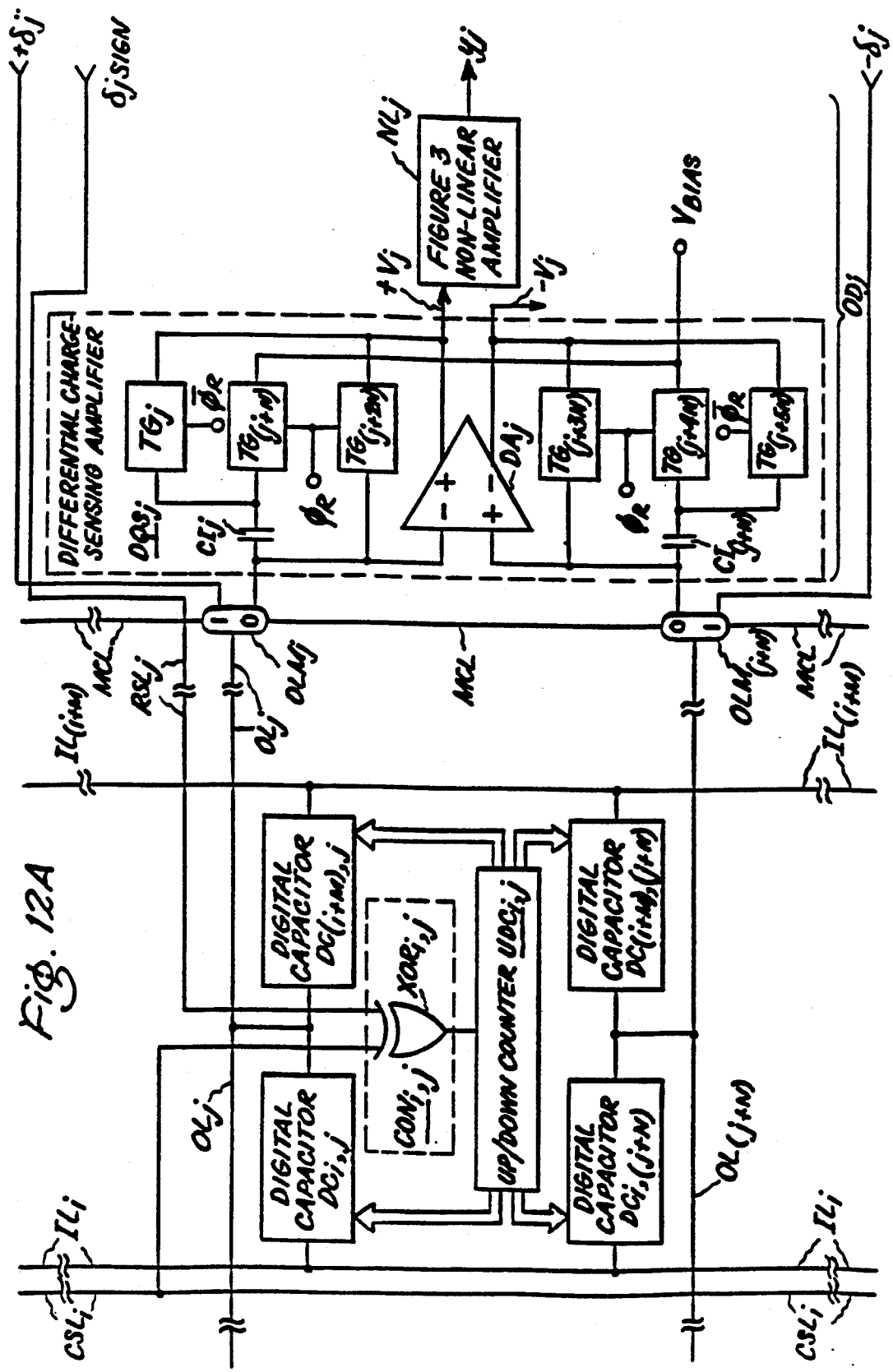
FIGS. 12A, 12B and 12C together form a FIG. 12 that is a schematic diagram of further modifications to the neural net, which use pairs of input lines driven by balanced input signals for connection to the pairs of differentially sensed output lines by weighting capacitors connected in bridge configurations.
Figure 12B:
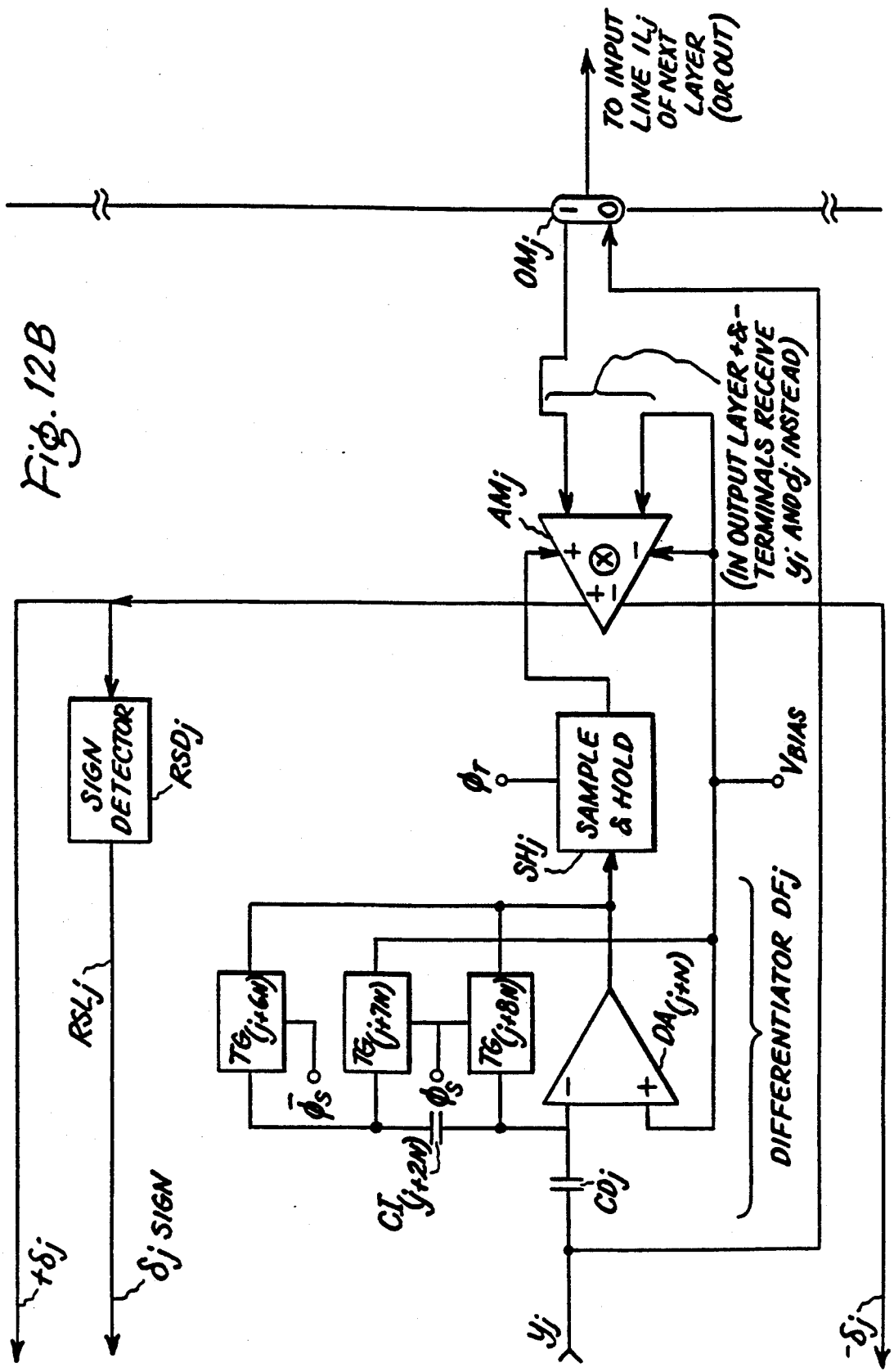
Figure 12C:
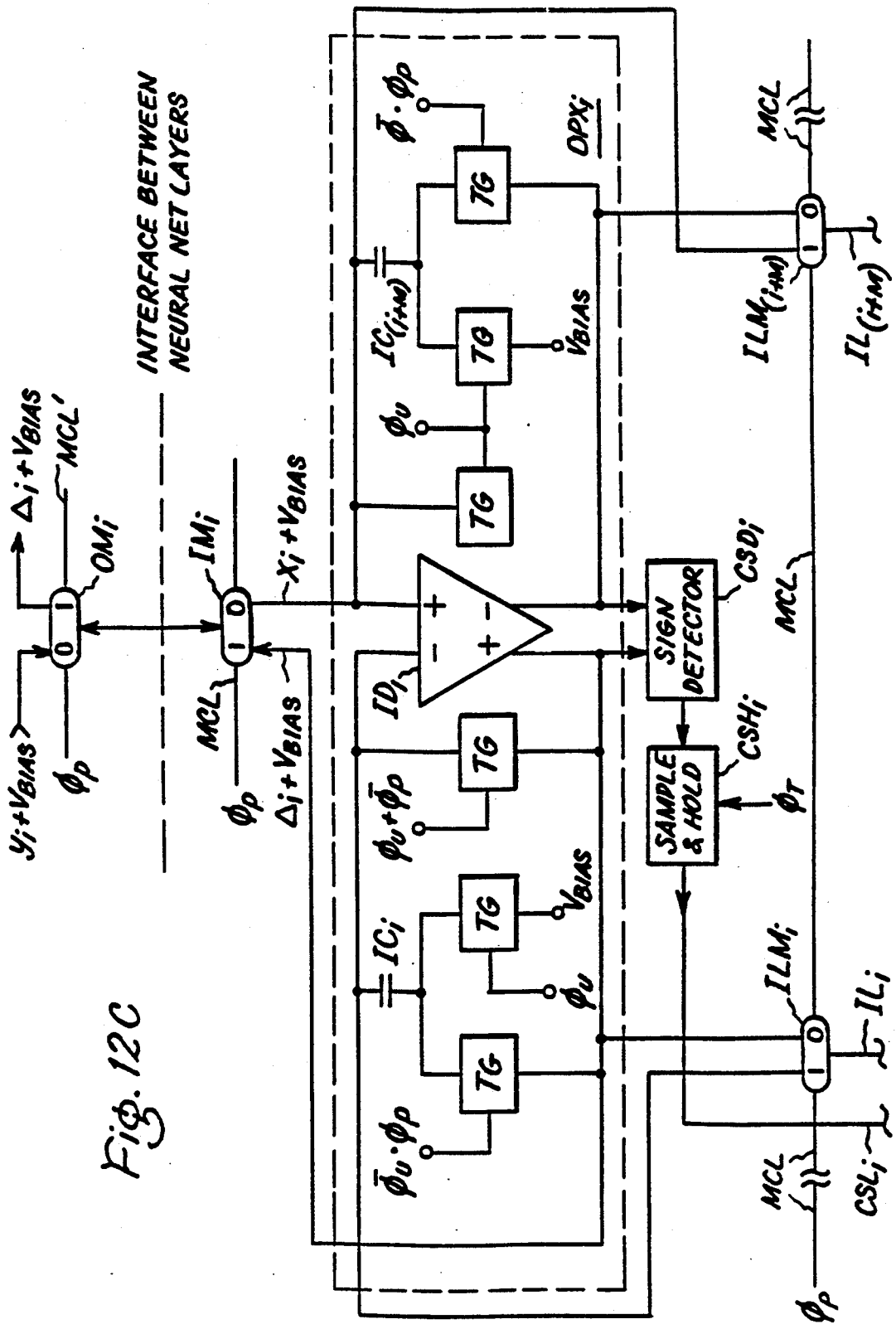

FIG. 12 comprising FIGS. 12A, 12B and 12C shows further modification that can be made to the FIG. 9 modification for the FIG. 1 neural net. This modification, as shown in FIG. 12A provides for a pair of input lines $IL_i$ and $IL_{(i+M)}$ for driving each bridge configuration of digital capacitors $DC_{i,j}$, $DC_{i,(j+N)}$, $DC_{(i+M),j}$ and $DC_{(i+M),(j+N)}$ push-pull rather than single-ended. Push-pull, rather than single-ended drive is provided to the differential charge sensing amplifier $DQS_j$, doubling its output response voltage. Push-pull drive also permits differential charge sensing amplifier $DSQ_j$ to be realized with differential-input amplifiers that do not provide for common-mode suppression of their output signals, if one so desires. FIG. 12A differs from FIG. 9A in that sign detector $CSD_i$ and $CSH_i$ do not appear, being relocated to appear in FIG. 12C as shall be considered further later on.

FIG. 12B differs from FIG. 9B in that the single-ended charge-sensing amplifier $QS_j$ does not appear, being inappropriate for sensing differences in charge appearing on a pair of input lines. Instead, $\delta_j+B_{BIAS}$ is developed in the following neural net layer and is fed back to analog multiplier $AM_j$ via the output multiplexer $OM_j$ when the $\phi_p$ signal on mode control line MCL is a ONE.

FIG. 12C shows circuitry that may be used in each neural net layer to provide balanced input signal drive to a pair of input lines $IL_i$ and $IL_{(i+M)}$ during normal operation and to differentially sense the charge on those input lines during back-propagation calculations. A single fully differential amplifier $ID_i$, which is by way of example of the type shown in FIG. 2, is multiplexed to implement both functions in duplex circuitry $DPX_i$ shown in FIG. 12C. Alternatively the functions could be implemented with separate apparatus.

During normal operation the $\phi_P$ signal appearing on mode control line MCL is a ZERO, conditioning an input multiplexer $IM_i$ to apply $x_i$ signal to the non-inverting (+) input terminal of differential amplifier $ID_i$ and conditioning input line multiplexers $ILM_i$ and $ILM_{(i+M)}$ to connect the non-inverting (+) and inverting (−) output terminals of differential amplifier $ID_i$ to input lines $IL_i$ and $IL_{(i+M)}$ respectively. A signal $\theta_P$ is a ONE during normal operation and appears in the $\phi_U+\phi_P$ control signal applied to a transmission gate between the non-inverting (+) output terminal of differential amplifier $ID_i$ and its inverting (−) input terminal, rendering that transmission gate conductive to provide direct-coupled feedback between those terminals.

This d-c feedback conditions differential amplifier $ID_i$ to provide $x_i$ and $-x_i$ responses at its (+) and (−) output terminals to the $x_i$ signal applied to its (−) input terminal. Other transmission gates within the duplex circuitry $DPX_i$ are conditioned to be non-conductive during normal operation.

During back-propagation calculations, the $\phi_P$ signal appearing on mode control line MCL is a ONE, conditioning input multiplexer $IM_i$ to apply $\Delta_i$ signal from the non-inverting (+) output terminal of differential amplifier $ID_i$ to the preceding neural net layer, if any, and conditioning input line multiplexers $ILM_i$ and $ILM-(i+M)$ to connect the input lines $IL_i$ and $IL_{(i+M)}$ to respective ones of the non-inverting (+) and inverting (−) input terminals of differential amplifier $ID_i$. Integrating capacitors $IC_i$ and $IC_{(i+M)}$ connect from the (+) and (−) output terminals of differential amplifier $ID_i$ to its (−) and (+) input terminals when transmission gates in duplex circuitry $DPX_i$ that are controlled by $\bar{\phi}_U \cdot \bar{\phi}_P$ signal receive a ZERO during back-propagation calculations. The charge conditions on integrating capacitors $IC_i$ and $IC_{(i+M)}$ are reset when $\phi_U$ occasionally pulses to ONE during back-propagation calculations. This happens in response to transmission gates in duplexer Circuitry $DpX_i$ receptive of $\phi_U$ and $\phi_U + \bar{\phi}_P$ control signals being rendered conductive responsive to $\phi_u$ being momentarily a ONE, while transmission gates in duplexer circuitry $DPX_i$ receptive of $\bar{\phi}_U$ control signal being rendered non-conductive.

Column sign detector $CSD_i$ and column sample and hold circuit $CSH_i$ appear in FIG. 12C. Column sign detector receives output signal from differential amplifier $ID_i$ directly as its input signal and can simply be a voltage comparator for the $x_i$ and $-x_i$ output signals from the differential amplifier $ID_i$.

The multiplexers employed in various portions of the circuits described above are customarily constructed of single-pole switch elements, each of which single-pole switch elements is conventionally a so-called "transmission gate" connection of one or more field effect transistors in CMOS design. A suitable transmission gate is provided by the paralleled channels of a p-channel FET and an n-channel FET having oppositely swinging control voltages applied to their respective gate electrodes to control the selective conduction of those paralleled channels.

In U.S. Pat. No. 4,950,917 issued Aug. 21, 1990 and entitled "SEMICONDUCTOR CELL FOR NEURAL NETWORK EMPLOYING A FOUR-QUADRANT MULTIPLIER" M.A. Holler, S.M. Tam, R.G. Benson and H.A. Castro describe using MOSFET transconductance multipliers for the weighting of synapse input signals prior to summation. The use of MOSFET transconductance multipliers for the weighting of synapse input signals prior to summation is also described by S. Bibyk and M. Ismail in the fifth chapter "Issues in Analog VSI and MOS Techniques for Neural Computing" on pages 104–133 of a book *Analog VLSI Implementation of Neural Systems* edited by C. Mead et alii and published by Kluwer Academic Publishers, Norwell MA, copyright 1989. The conductances presented by the MOSFETs in these transconductance multipliers consume power in proportion to computing speed just as the conductances of the resistive interconnecting elements do in the prior-art neural networks employing operational amplifiers and resistive interconnecting elements, referred to in the background of the invention portion of this specification.

In U.S. Pat. No. 4,161,785 issued Jul. 17, 1979, entitled "MATRIX MULTIPLIER" and assigned to General Electric Company, E.P. Gasparek describes a matrix multiplier making use of single-stage, charge-coupled device (CCD) shift registers for multiplying sampled data in analog format by a matrix of stored values also in analog format and of positive or negative sign.

One skilled in the art and acquainted with the foregoing specification will be able to design numerous variants of the preferred embodiments described therein, and this should be borne in mind when construing the following claims.

What is claimed is:

1. A processor for providing an output voltage response to a plurality M in number of input voltage signals, M being a positive integer, said processor comprising:

a plurality, M in number, of input lines respectively identified be consecutive ordinal numbers, first through $M^{th}$, for receiving respective ones of said input voltage signals;

a pair of output lines, each insulated from its surroundings and exhibiting respective capacitance respective to its surroundings;

exclusive means for connecting said first through $M^{th}$ input lines to said pair of output lines, said means not being any portion of a transconductance multiplier, said means connecting said first through $M^{th}$ input lines to said pair of output lines without any paths for substantial direct current conduction between said input and said output lines and essentially consisting of respective capacitive elements connecting each of said input lines to each of said output lines, each said capacitive element having a respective first plate connected without any substantial intervening element to its respective said input line and having a respective second plate connected without any substantial intervening element to its respective said output line, none of said capacitive elements being included in a charge-coupled-device shift register;

means for maintaining substantially equal capacitances on each output line in said pair thereof; and means for generating a voltage response to change in the difference of charge on the respective capacitances of said pair of output lines respective to their surroundings, which voltage response corresponds to said output voltage response to said plurality M in number of input signals.

2. A processor as set forth in claim 1 wherein the capacitances of each pair of said capacitive elements connecting the same input line to said pair of output lines add together to a same prescribed value.

3. A processor as set forth in claim 1 wherein said means for providing a voltage response includes:

a differential charge-sensing amplifier, having an inverting input port and a non-inverting input port to which respective ones of said pair of output lines connect and having an output port for supplying a signal indicative of the differential change in charge on said pair of output lines, and a non-linear amplifier providing at an output port thereof non-linear response to said signal indicative of the differential change in charge on said pair of output lines.

4. A processor as set forth in claim 3, wherein the signal supplied by said differential charge-sensing amplifier is a signal voltage indicative of the differential change in charge on said pair of output lines, and wherein said non-linear amplifier comprises:

first and second insulated-gate field-effect transistors respectively of first and second conductivity types, which conductivity types are complementary respective to each other, each of said first and second transistors having a respective gate electrode and a respective source electrode and a respective drain electrode, the gate electrode of said first transistor connected from the output port of said differential charge-sensing amplifier, the gate electrode of said second transistor connected from the source electrode of said first transistor, and the source electrode of said second transistor supplying the output voltage of said non-linear amplifier;

means for connecting said first transistor to operate as a source follower that saturates responsive to the signal voltage indicative of the differential change in charge on said pair of output lines exhibiting an excursion of a first polarity sense beyond a prescribed absolute value; and means for connecting said second transistor to operate as a source follower that saturates responsive to the signal voltage indicative of the differential change in charge on said pair of output lines exhibiting an excursion of a second polarity sense beyond a prescribed absolute value, said first and second senses of polarity being opposite to each other.

5. A processor as set forth in claim 3 wherein said non-linear amplifier is of a type exhibiting a voltage gain that is sigmoidal in nature.

6. A processor as set forth in claim 1, said processor further comprising:

a plurality, M in number of further input lines respectively identified by consecutive ordinal numbers $(M+1)^{th}$ through $2M^{th}$;

means for applying to each further input line an input signal the same in amplitude but opposite in polarity as the input signal received by an input line paired therewith and identified by the ordinal number lower by M; and a respective pair of capacitive elements for each of said further input lines respectively connecting that further input line to separate ones of said pair of output lines.

7. A processor as set forth in claim 6 wherein said means for maintaining substantially equal capacitances on each output line in said pair thereof primarily consists of said capacitive elements.

8. A plurality, N in number, of processor of the type set forth in claim 6, respectively identified by respective consecutive ordinal numbers first through $N^{th}$, N being a positive integer, said first through $N^{th}$ processors having each set of their input lines that are identified by the same ordinal number connected to be receptive of the same input signal, thereby to provide a neural net layer.

9. A processor as set forth in claim 1, wherein said means for providing a voltage response essentially consists of:

a non-linear voltage amplifier having an inverting input port and a non-inverting input port to which respective ones of said pair of output lines connect and having an output port at which said non-linear voltage response is provided; and means for clamping said output lines to a reference voltage at selected times.

10. A processor as set forth in claim 9 wherein said non-linear voltage amplifier is of a type exhibiting a voltage response to change in the difference of charge on the respective capacitances of said pair of output lines respective to their surroundings that is sigmoidal in nature.

11. A plurality, N in number, of processors of the type set forth in claim 9, respectively identified by respective consecutive ordinal numbers first through $N^{th}$, N being a positive integer, said first through $N^{th}$ processors having each of their input lines that are identified by the same ordinal number connected to be receptive of the same input signal, thereby to provide a neural network layer.

12. A plurality, L in number, of neural net layers of the type set forth in claim 11, respectively identified by consecutive ordinal numbers zeroeth through $(L-1)^{th}$, L being a positive integer, the non-linear amplifiers of the processors in each of said neural net layers after the zeroeth supplying their output signals to determine the input signal voltages of respective processors in neural net layers of lower ordinal numbering.

13. A plurality of connected neural network layers as set forth in claim 12 wherein the values of M and of N are the same within each neural net layer and for all of the neural layers.

14. A processor for providing "axon" response to a plurality M in number of "synapse" input voltage signals, M being a positive integer, said processor comprising:

a plurality, M in number, of input lines respectively identified by consecutive ordinal numbers, first through $M^{th}$, for receiving respective ones of said input voltage signals;

a pair of output lines, each insulated from its surroundings and exhibiting respective capacitance respective to its surroundings;

respective capacitive elements connecting each of said input lines to each of said output lines, wherein the capacitances of each pair of said capacitive elements connecting the same input line to said pair of output lines add together to a same prescribed value, and wherein each of said capacitive elements is a respective digital capacitor having a structure equivalent to the structure of each of the others, each said digital capacitor having a capacitance that is programmed by a respective binary number programming signal and that is altered responsive to a change in said respective binary number programming signal;

means for maintaining substantially equal capacitances on each output line in said pair thereof, which means includes said respective capacitive elements; and means for providing a non-linear voltage response to change in the difference of charge on the respective capacitances of said pair of output lines respective to their surroundings, which non-linear voltage response is said "axon" response to said plurality M in number of input signals.

15. A processor as set forth in claim 14 having associated therewith:

a respective binary counter for each said pair of capacitive elements supplying their programming signals; and means for controlling the incrementing and decrementing of the binary count in each of said binary counters.

16. A processor as set forth in claim 14 including:
a respective memory array for binary numbers having a respective word storage element for each of said pairs of capacitive elements for supplying the binary numbers applied to that pair of capacitive elements as their programming signal.

17. A plurality, L in number, of neural net layers of a type for being trained during at least one training period of time, each followed by a respective operating period of time, said neural net layers respectively identified by consecutive ordinal numbers zeroeth through $(L-1)^{th}$, L being a positive integer, each said neural net layer comprising:
a respective plurality, M in number, of processors of the type set forth in claim 16, respectively identified by respective consecutive ordinal numbers first through $M^{th}$, the processors in each of said neural net layers other than the zeroeth supplying the output signals from their non-linear amplifiers to determine the input voltage signals applied to the corresponding originally numbered input lines of processors in said neural network layer of next lower ordinal numbering;
differentiation means associated with each said processor for determining, for a predetermined set of said input voltage signals, the slope of said non-linear response from its said means for providing a non-linear voltage response;
means for multiplying the slope of the non-linear voltage response for each said processor by an input error signal identified by the same ordinal number as that processor, thereby to generate a respective modified error signal associated with each processor;
means for applying, during said training time, said modified error signal associated with each processor, in balanced form to said pair of output lines associated with that said processor;
means for changing the binary number stored in each said word storage element during each training period by an amount related to the product of (1) the input signal applied to the one of the first through $M^{th}$ input lines to which connects said pair of capacitive elements receiving their programming signals from that word storage element and (2) the modified error signal applied to the output lines to which said pair of capacitive elements connects; and
a plurality M in number of charge-sensing amplifiers being respectively identified by consecutive ordinal numbers first through $M^{th}$, having respective input ports respectively connected to the input lines identified by the same ordinal number as their own, and having respective output ports responding to the charge flow to their respective said input ports during each said training period of time for generating respective output error signals each identified by the same ordinal number as the charge-sensing amplifier generating it, the first through $M^{th}$ input error signals in each neural network layer other than the zeroeth corresponding to the first through $M^{th}$ output error signals from the neural net with next lower ordinal number.

18. A plurality, N in number, of processors of the type set forth in claim 16, respectively identified by respective consecutive ordinal numbers first through $N^{th}$, N being a positive integer, said first through $N^{th}$ processors having each of their input lines that are identified by the same ordinal number connected to be receptive of the same input signal, thereby to provide a neural network layer.

19. A plurality, L in number, of neural net layers of the type set forth in claim 18, respectively identified by consecutive ordinal numbers zeroeth through $(L-1)^{th}$, L being a positive integer, the non-linear amplifiers of the processors in each of said neural net layers after the zeroth supplying their output signals to determine the input voltage signals of respective processors in neural network layers of lower numbering.

20. A neural net layer as set forth in claim 18 of a type for being trained during at least one training period of time, each followed by a respective operating period of time, said neural net layer having:
differentiation means associated with each said processor for determining, for a predetermined set of said input voltage signals, the slope of said non-linear response from its said means for providing a non-linear voltage response;
means for multiplying the slope of the non-linear voltage response for each said processor by an error signal associated with that processor thereby to generate a respective modified error signal associated with each processor;
means for applying, during said training time, said modified error signal associated with each processor, in balanced form to said pair of output lines associated with that said processor;
means for changing the binary number stored in each said work storage element during each training period by an amount related to the product of (1) the input signal applied to the one of the first through $M^{th}$ input lines to which connects said pair of capacitive elements receiving their programming signals from that word storage element and (2) the modified error signal applied to the output lines to which said pair of capacitive elements connects; and
a plurality M in number of charge-sensing amplifiers being respectively identified by consecutive ordinal numbers first through $M^{th}$, having respective input ports respectively connected to the input lines identified by the same ordinal number as their own, and having respective output ports responding to the difference of charge flow to their respective said input ports during each said training period of time for generating respective error signals.

21. A neural net layer as set forth in claim 20 wherein each said word storage element comprises:
a respective up/down binary counter having respective count output ports from which the binary number stored therein are available, connected to receive a repetitive clocking signal, having a respective count enable input port, and having a respective up/down control port; and
a respective exclusive-OR gate being associated with each said up/down binary counter, having an output port connecting to the up/down control port of said up/down binary counter associated therewith, having a first input port responding to the sign of input signal applied to the input line to which connect the capacitive elements receiving their programming signals responsive to the binary numbers stored within said associated up/down counter and having a second input port receptive of signal corresponding to the sign of the modified error signal applied in balanced form to the output lines to which connect the capacitive elements receiving their programming signals responsive to the binary numbers stored within said associated up/down counter.

22. A processor for providing "axon" response to a plurality M in number of "synapse" input voltage signals, M being a positive integer, said processor comprising:

a plurality, M in number, of input lines respectively identified by consecutive ordinal numbers, first through $M^{th}$, for receiving respective ones of said input voltage signals;

a plurality, M in number, of further input lines respectively identified by consecutive ordinal numbers $(M+1)^{th}$ through $2M^{th}$;

means for applying to each further input line an input signal the same in amplitude but opposite in polarity as the input signal received by an input line paired therewith and identified by the ordinal number lower by M;

a pair of output lines, each insulated from its surroundings and exhibiting respective capacitance respective to its surroundings;

exclusive means for connecting said first through $2M^{th}$ input lines to said pair of output lines, said means connecting said first through $2M^{th}$ input lines to said pair of output lines without any paths for substantial direct current conduction between said input and said output lines, said means maintaining substantially equal capacitances on each output line in said pair thereof, which means essentially consists of capacitive elements including a respective set of four said capacitive elements connecting each of said $(M+1)^{th}$ through $2M^{th}$ further input lines and the one of said first through $M^{th}$ input lines paired therewith and identified by the ordinal number lower by M to each of said output lines, wherein each of said capacitive elements has a capacitance that is programmed by a respective binary number programming signal and that can be altered responsive to a change in said respective binary number programming signal; and means for providing a non-linear voltage response to change in the difference of charge on the respective capacitances of said pair of output lines respective to their surroundings, which non-linear voltage response is said "axon" response to said plurality M in number of input signals.

23. A processor as set forth in claim 22 having associated therewith:

a respective binary counter for supplying the programming signals for each set of four of said capacitive elements connecting to a pair of input lines identified by ordinal numbers M apart; and means for controlling the incrementing and decrementing of the binary count in each of said binary counters.

24. A processor as set forth in claim 22 including:

a respective memory array for binary numbers having a respective word storage element for each set of four of said capacitive elements connecting to a pair of input lines identified by ordinal numbers M apart, for supplying the binary number applied to those capacitive elements as their programming signal.

25. A plurality, L in number, of neural net layers of a type for being trained during at least one training period of time, each followed by a respective operating period of time, said neural net layers respectively identified by consecutive ordinal numbers zeroeth through $(L-1)^{th}$, L being a positive integer, each said neural net layer comprising:

a respective plurality, M in number, of processors of the type set forth in claim 24, respectively identified by respective consecutive ordinal numbers first through $M^{th}$, the processors in each of said neural net layers other than the zeroeth supplying the output signals from their non-linear amplifiers to determine the input voltage signals applied to the corresponding ordinally numbered input lines of processors in said neural network layer of next lower ordinal numbering;

differentiation means associated with each said processor for determining, for a predetermined set of said input voltage signals, the slope of said non-linear response from its said means for providing a non-linear voltage response;

means for multiplying the slope of the non-linear voltage response for each said processor by an input error signal identified by the same ordinal number as that processor, thereby to generate a respective modified error signal associated with each processor;

means for applying, during said training time, said modified error signal associated with each processor, in balanced form to said pair of output lines associated with that said processor;

means for changing the binary number stored in each said word storage element during each training period by an amount related to the product of (1) the input signal applied to the one of the first through $M^{th}$ input lines to which connects said pair of capacitive elements receiving their programming signals from that word storage element and (2) the modified error signal applied to the output lines to which said pair of capacitive elements connects; and a plurality M in number of differential charge-sensing amplifiers being respectively identified by consecutive ordinal numbers first through $M^{th}$, having respective first input ports respectively connected to the input lines identified by the same ordinal number as their own, having respective second input ports respectively connected to the input lines identified by an ordinal number larger by M than their own, and having respective output ports responding to the signals supplied to their respective said input ports during each said training period of time for generating respective output error signals each identified by the same ordinal number as the charge-sensing amplifier generating it, the first through $M^{th}$ input error signals in each neural network layer other than the zeroeth corresponding to the first through $M^{th}$ output error signals from the neural net with next lower ordinal number.

26. A neural net layer as set forth in claim 25 wherein each said word storage element comprises:

a respective up/down binary counter having respective count output ports from which the binary numbers stored therein are available, having a respective clock input port connected to receive a repetitive clocking signal, and having a respective up/down control port; and a respective exclusive-OR gate being associated with each said up/down binary counter, having an output port connecting to the up/down control port of said up/down binary counter associated therewith, having a first input port responding to the sign of input signal applied to the one of said first through $M^{th}$ input lines to which connect ones of said capacitive elements receiving their programming signals responsive to binary number stored within said associated up/down binary counter, and having a second input port receptive of signal corresponding to the sign of the modified error signal applied in balanced form to the output lines to which connect the admittance elements receiving their programming signals responsive to the binary number stored within said associated up/down counter.

27. A plurality, N in number, of processors of the type set forth in claim 24, respectively identified by respective consecutive ordinal numbers first through $N^{th}$, N being a positive integer, said first through $N^{th}$ processors having each set of their input lines that are identified by the same ordinal number connected to be receptive of the same input signal, thereby to provide a neural network layer.

28. A plurality, L in number, of neural net layers of the type set forth in claim 27, respectively identified by consecutive ordinal numbers zeroeth through $(L-1)^{th}$, L being a positive integer, the non-linear amplifiers of the processors in each of said neural net layers after the zeroeth supplying their output signals to determine the input voltage signals of respective processors in neural network layers of lower numbering.

29. A neural net layer as set forth in claim 27 of a type for being trained during at least one training period of time, each followed by a respective operating period of time, said neural net layer having
    differentiation means associated with each said processor for determining, for a predetermined set of said input voltage signals, the slope of said non-linear response from its said means for providing a non-linear voltage response;
    means for multiplying the slope of the non-linear response for each said processor by an error signal associated with that processor, thereby to generate a respective modified error signal associated with each processor;
    means for applying, during said training time, said modified error signal associated with each processor in balanced form to said pair of output lines associated with that said processor;
    means for changing the binary number stored in each said word storage element during each training period by an amount related to the product of (1) the input signal applied to the one of the first through $M^{th}$ input lines to which connects a said pair of capacitive elements receiving their programming signals from that word storage element and (2) the modified error signal applied to the output lines to which of said pair of capacitive elements connects; and
    a plurality M in number of differential charge-sensing amplifiers being respectively identified by consecutive ordinal numbers first through $M^{th}$, having respective first input ports respectively connected to the input lines identified by the same ordinal number as their own, having respective input ports connected to the input lines identified by ordinal number larger by M than their own, and having respective output ports responding to the signals supplied to their respective input ports during each said training period of time.

30. A neural net layer, for responding to a plurality M in number of "synapse" input signal voltages identified by consecutive ordinal numbers first through $M^{th}$, to generate a plurality N in number of "axon" output signal voltages identified by consecutive ordinal numbers first through $N^{th}$, M and N each being a respective positive plural integer, said neural net comprising:
    a plurality M in number of input lines respectively identified by consecutive ordinal numbers first through $M^{th}$;
    a plurality 2N in number of output lines respectively identified by consecutive ordinal numbers first through $2N^{th}$;
    exclusive means for connecting said first through $M^{th}$ input lines to said first through $2N^{th}$ output lines, said means connecting said first through $M^{th}$ input lines to said first through $2N^{th}$ output lines without any paths for substantial direct current conduction between said input and said output lines, said means not being any portion of a transconductance multiplier and essentially consisting of
    a respective capacitive element for connecting each of said first through $M^{th}$ input lines to each of certain said output lines, each said capacitive element having a respective first plate connected without any substantial intervening element to its respective said input lines and having a respective second plate connected without any substantial intervening element to its respective said input line, none of said capacitive elements being included in a charge-coupled-device shift register;
    means for equalizing the capacitances said output lines exhibit to their surroundings; and
    a plurality N in number of differential-input output driver amplifiers identified by consecutive ordinal numbers first through $N^{th}$; each output driver amplifier having an inverting input connection from the output line identified by the same ordinal number, having a non-inverting input connection from the output line identified by the ordinal number higher by N, having an output connection, and having a non-linear voltage-versus-differential-charge transfer characteristic of a type suitable for generating a respective one of said "axon" output voltages at its said output connection.

31. A neural net layer as set forth in claim 30 wherein each capacitive element is of a type the capacitance of which is programmable responsive to a respective programming signal and can be altered responsive to a change in said respective programming signal, and wherein each pair of capacitive elements connecting an input line to the same differential-input output driver amplifier have respective capacitances summing to a prescribed value.

32. A neural net layer as set forth in claim 31 wherein each capacitive element connecting said input line to said output line has associated therewith a respective further capacitive element connecting that said input line to ac ground, which further capacitive element is of a type the capacitance of which is programmable responsive to a respective programming signal, each capacitive element and further capacitive element associated with each other having respective capacitances summing to said prescribed value.

33. A neural net layer as set forth in claim 30 wherein said capacitive elements have capacitances chosen so that the capacitances said output lines have to their surroundings all are substantially equal to each other, thereby to provide said means for equalizing the capacitances said output lines exhibit to their surroundings, and so that the capacitances said input lines have to their surroundings all are substantially equal to each other.

34. A neural net layer as set forth in claim 33 wherein each of said capacitive elements is of a type the capacitance of which is programmable responsive to a respective programming signal and is altered during the operation of said neural net layer responsive to any change in said programming signal.

35. A neural net layer, for responding to a plurality M in number of "synapse" input signal voltages identified by consecutive ordinal numbers first through $M^{th}$, to generate a plurality N in number of "axon" output signal voltages identified by consecutive ordinal numbers first through $N^{th}$, M and N each being a respective positive plural integer, said neural net layer comprising:
- a plurality M in number of input lines respectively identified by consecutive ordinal numbers first through $2N^{th}$;
- a plurality 2N in number of output lines respectively identified by consecutive ordinal numbers first through $2N^{th}$;
- exclusive means for connecting said first through $M^{th}$ input lines to said first through $2N^{th}$ output lines, said means connecting said first through $M^{th}$ input lines to said first through $2N^{th}$ output lines without any paths for substantial direct current conduction between said input and said output lines, said means including
- a respective capacitive element for connecting each of said first through $M^{th}$ input lines to each of certain said output lines, each of which capacitive elements is of a type the capacitance of which is programmable responsive to a respective programming signal, and each pair of which capacitive elements connecting an input line to the same differential-input output driver amplifier have respective capacitances summing to a prescribed value;
- means for equalizing the capacitances said output lines exhibit to their surroundings, wherein each capacitive element connecting said input line to said output line has associated therewith a respective further capacitive element connecting that said input line to ac ground, which further capacitive element is of a type the capacitance of which is programmable responsive to a respective programming signal, each capacitive element and further capacitive element associated with each other having respective capacitances summing to said prescribed value;
- a plurality N in number of differential-input output driver amplifiers identified by consecutive ordinal numbers first through $N^{th}$, each output driver amplifier having an inverting input connection from the output line identified by the same ordinal number, having a non-inverting input connection from the output line identified by the ordinal number higher by N, having an output connected, and having a non-linear voltage-versus-differential-charge transfer characteristic of a type suitable for generating a respective one of said "axon" output signal voltages at its said output connection;
- a respective differentiator associated with each output driver amplifier for measuring the slope of its transfer characteristic for a given set of input voltage signals;
- means for temporarily storing the measured slopes of the transfer characteristic of each of said output drive amplifiers;
- a respective analog multiplier associated with each said output driver amplifier, each said analog multiplier multiplying the temporarily stored measured slope of the transfer characteristic of the one of said output driver amplifiers with which it is associated with a respective input error signal to generate a respective product signal; p1 means for applying during training periods the product signal of each said analog multiplier in balanced form to the output lines to which its associated output driver amplifier responds to differential changes in charge on; and
- a plurality M in number of sensing amplifiers identified by consecutive ordinal numbers first through $M^{th}$, each having a respective input terminal connecting at least during times of training to sense the charge on the input line identified by the same ordinal number as that said sensing amplifier, and each having an output terminal at which a respective output error signal is provided.

36. A neural net layer, for responding to a plurality M in number of input signal voltages identified by consecutive ordinal numbers first through $M^{th}$, to generate a plurality N in number of output signal voltages identified by consecutive ordinal numbers first through $N^{th}$, M and N each being a respective positive plural integer, said neural net layer comprising:
- a plurality 2M in number of input lines respectively identified by consecutive ordinal numbers first through $2M^{th}$;
- means for applying each input signal in balanced form to the input line identified by the same ordinal number and to the input line identified by an ordinal number M higher;
- a plurality 2N in number of output lines respectively identified by consecutive ordinal numbers first through $2N^{th}$;
- a respective capacitive element for connecting each of said first through $M^{th}$ input lines to each of certain said output lines, each of which capacitive elements is of a type the capacitance of which is programmable responsive to a respective programming signal and is altered during the operation of said neural net layer responsive to any change in said programming signal;
- a respective capacitive element for connecting each of said $(m+1)^{th}$ through $2M^{th}$ input lines to each of certain said output lines, each of which capacitive elements is of a type the capacitance of which is programmable responsive to a respective programming signal and is altered during the operation of said neural net layer responsive to any change in said programming signal;
- means, including said capacitive elements, for equalizing the capacitances said output lines exhibit to their surroundings and the capacitances said input lines exhibit to their surroundings;
- a plurality N in number of differential-input output driver amplifiers identified by consecutive ordinal numbers first through $N^{th}$, each having an inverting input connection from the output line identified by the same ordinal number and having a non-inverting input connection from the output line identified by the ordinal number higher by N, each said output driver amplifier having a non-linear voltage-versus-differential-charge transfer characteristic;

a respective differentiator associated with each output driver amplifier for measuring the slope of its transfer characteristic for a given set of input voltage signals;

means for temporarily storing the measured slopes of the transfer characteristic of each of said output driver amplifiers;

a respective analog multiplier associated with each said output driver amplifier, each said analog multiplier multiplying the temporarily stored measured slope of the transfer characteristic of the one of said output driver amplifiers with which it is associated with a respective input error signal to generate a respective product signal;

means for applying during training periods the product signal of each said analog multiplier in balanced form to the output lines to which its associated output driver amplifier responds to differential changes in charge on; and a plurality M in number of differential charge-sensing amplifiers identified by consecutive ordinal numbers first through $M^{th}$, each having a respective input terminal connecting at least during times of training to sense the difference in the charge on the input line identified by the same ordinal number as that said sensing amplifier and the charge on the input line identified by the ordinal number M higher than that of said sensing amplifier, and each having an output terminal at which a respective output error signal is provided.

37. A processor for providing an "axon" response to a plurality of "synapse" input signal voltages, said processor comprising:

means for generating a voltage descriptive of a weighted summation of said "synapse" input signal voltages;

first and second insulated-gate field-effect transistors respectively of first and second conductivity types, which conductivity types are complementary respective to each other, each of said first and second transistors having a respective gate electrode and a respective source electrode and a respective drain electrode, the gate electrode of said first transistor connected to receive said voltage description of a weighted summation of said "synapse" input signal voltages, the gate electrode of said second transistor connected from the source electrode of said first transistor, and the source electrode of said second transistor arranged to supply said "axon" response;

means for connecting said first transistor to operate as a source follower that saturates responsive to said voltage descriptive of a weighted summation of said "synapse" input signal voltages exhibiting an excursion of a first polarity sense beyond a prescribed absolute value, so as to limit the excursion of said "axon" response in said first polarity sense; and means for connecting said second transistor to operate as a source follower that saturates responsive to said voltage descriptive of a weighted summation of said "synapse" input signal voltages exhibiting an excursion of a second polarity sense beyond a prescribed absolute value, so as to limit said "axon" response in said second polarity sense such that said "axon" response is limited symmetrically in said first and second polarity senses.

38. A processor for providing an output voltage response to a plurality M in number of input voltage signals, M being a positive integer, said processor comprising:

a plurality, M in number, of input lines respectively identified by consecutive ordinal numbers, first through $M^{th}$, for receiving respective ones of said input voltage signals;

a plurality, M in number of further input lines respectively identified by consecutive ordinal numbers $(M+1)^{th}$ through $2M^{th}$;

means for applying to each further input line an input signal the same in amplitude but opposite in polarity as the input signal received by an input line paired therewith and identified by the ordinal number lower by M;

a pair of output lines, each insulated from its surroundings and exhibiting respective capacitance respective to its surroundings;

means for connecting said first through $M^{th}$ input lines to said pair of output lines without any paths for substantial direct current conduction between said input and said output lines and for maintaining substantially equal capacitances on each output line in said pair thereof, which means is not any portion of a transconductance multiplier and essentially consists of capacitive elements, including respective capacitive elements connecting each of said input lines to each of said output lines, each said capacitive element connecting one of said input lines to one of said output lines having a respective first plate connected without any substantial intervening element to its respective said input line and having a respective second plate connected without any substantial intervening element to is respective said output line; and means for providing a voltage response to change in the difference of charge on the respective capacitances of said pair of output lines respective to their surroundings, which voltage response corresponds to said output voltage response to said plurality M in number of input signals.

39. A processor for providing an output voltage response to a plurality M in number of input voltage signals, M being a positive integer, said processor comprising:

a plurality, M in number, of input lines respectively identified by consecutive ordinal numbers, first through $M^{th}$, for receiving respective ones of said input voltage signals;

first and second output lines, each insulated from its surroundings and exhibiting respective capacitance respective to it surroundings;

first through $M^{th}$ digital capacitors respectively connecting said first through $M^{th}$ input lines to said first output line, and $(m+1)^{th}$ through $2M^{th}$ digital capacitors respectively connecting said first through $M^{th}$ input lines to said second output line, each said digital capacitor having a capacitance that is programmed by a respective binary number programming signal;

a memory array for binary numbers having a plurality of word storage elements respectively identified by connective ordinal numbers first through $M^{th}$, each said word storage element temporarily storing the binary programming signals for said digital capacitors identified by the same ordinal number and by the ordinal number M higher;

means for serially re-writing the contents of said plurality of word storage elements; and means for generating a voltage response to change in the difference of charge on the respective capacitances of said pair of output lines respective to their surroundings, which voltage response corresponds to said output voltage response to said plurality M in number of input signals.

40. A processor for providing an output voltage response to a plurality M in number of input voltage signals, M being a positive integer, said processor comprising:

a plurality, M in number, of input lines respectively identified by consecutive ordinal numbers, first through $M^{th}$, for receiving respective ones of said input voltage signals;

first and second output lines, each insulated from its surroundings and exhibiting respective capacitance respective to it surroundings;

first through $M^{th}$ digital capacitors respectively connecting said first through $M^{th}$ input lines to said first output line, and $(m+1)^{th}$ through $2M^{th}$ digital capacitors respectively connecting said first through $M^{th}$ input lines to said second output line, each said digital capacitor having a capacitance that is programmed by a respective binary number programming signal;

a plurality of binary counters M in number identified by respective ones of the ordinal numbers first through $M^{th}$, each of said first through $M^{th}$ binary counters connected for supplying the programming signal for said digital capacitors identified by the corresponding ordinal number and the ordinal number higher by M;

means for controlling the incrementing and decrementing of the binary count in each of said binary counters; and means for generating a voltage response to change in the difference of charge on the respective capacitances of said pair of output lines respective to their surroundings, which voltage response corresponds to said output voltage response to said plurality M in number of input signals.

41. A processor for providing an output voltage response to a plurality M in number of input voltage signals, M being a positive integer, said processor comprising:

a plurality, M in number, of input lines respectively identified by consecutive ordinal numbers, first through $M^{th}$, for receiving respective ones of said input voltage signals;

a plurality, M in number of further input lines respectively identified by consecutive ordinal numbers $(M+1)^{th}$ through $2M^{th}$;

means for applying to each further input line an input signal the same in amplitude but opposite in polarity as the input signal received by an input line paired therewith and identified by the ordinal number lower by M;

first and second output lines, each insulated from its surroundings and exhibiting respective capacitance respective to its surroundings;

first through $M^{th}$ digital capacitors respectively connecting said first through $M^{th}$ input lines to said first output line, $(M+1)^{th}$ through $2M^{th}$ digital capacitors respectively connecting said first through $M^{th}$ input lines to said second output line, $(2M+1)^{th}$ through $3M^{th}$ digital capacitors respectively connecting said $(M+1)^{th}$ through $2M^{th}$ input lines to said first output line, and $(3M+1)^{th}$ through $4M^{th}$ digital capacitors respectively connecting said $(M+1)^{th}$ through $2M^{th}$ input lines to said second output line, each said digital capacitor having a capacitance that is programmed by a respective binary number programming signal;

a memory array for binary numbers having a plurality of word storage elements respectively identified by connective ordinal numbers first through $M^{th}$, each said word storage element temporarily storing the binary programming signals for said digital capacitors identified by the same ordinal number, by the ordinal number M higher, by the ordinal number 2M higher, and by the ordinal number 3M higher;

means for serially re-writing the contents of said plurality of word storage elements; and means for providing a voltage response to change in the difference of charge on the respective capacitances of said pair of output lines respective to their surroundings, which voltage response corresponds to said output voltage response to said plurality M in number of input signals.

42. A processor for providing an output voltage response to a plurality M in number of input voltage signals, M being a positive integer, said processor comprising:

a plurality, M in number, of input lines respectively identified by consecutive ordinal numbers, first through $M^{th}$, for receiving respective ones of said input voltage signals;

a plurality, M in number of further input lines respectively identified by consecutive ordinal numbers $(M+1)^{th}$ through $2M^{th}$;

means for applying to each further input line an input signal the same in amplitude but opposite in polarity as the input signal received by an input line paired therewith and identified by the ordinal number lower by M;

first and second output lines, each insulated from its surroundings and exhibiting respective capacitance respective to its surroundings;

first through $M^{th}$ digital capacitors respectively connecting said first through $M^{th}$ input lines to said first output line, $(M+1)^{th}$ through $2M^{th}$ digital capacitors respectively connecting said first through $M^{th}$ input lines to said second output line, $(2M+1)^{th}$ through $3M^{th}$ digital capacitors respectively connecting said $(M+1)^{th}$ through $2M^{th}$ input lines to said first output line, and $(3M+1)^{th}$ through $4M^{th}$ digital capacitors respectively connecting said $(M+1)^{th}$ through $2M^{th}$ input lines to said second output line, each said digital capacitor having a capacitance that is programmed by a respective binary number programming signal;

a plurality of binary counters M in number identified by respective ones of the ordinal numbers first through $M^{th}$, each of said first through $M^{th}$ binary counters connected for supplying the programming signal for said digital capacitors identified by the same ordinal number, by the ordinal number M higher, by the ordinal number 2M higher, and by the ordinal number 3M higher;

means for controlling the incrementing and decrementing of the binary count in each of said binary counters; and means for providing a voltage response to change in the difference of charge on the respective capacitances of said pair of output lines respective to their surroundings, which voltage response corresponds to said output voltage response to said plurality M in number of input signals.

43. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a plurality, M in number, of input lines respectively identified by connective ordinal numbers first through $M^{th}$, M being a positive integer, and shared with the others of said plurality N in number of processors;

a pair of respective output lines respectively identified by the same ordinal number as said processor and by the ordinal number higher by N;

first through $M^{th}$ digital capacitors respectively connecting said first through $M^{th}$ input lines to said output line identified by the same ordinal number as said processor, and $(M+1)^{th}$ through $2M^{th}$ digital capacitors respectively connecting said first through $M^{th}$ input lines to said second output line identified by the ordinal number higher by N than the ordinal number of said processor, each said digital capacitor having a capacitance that is programmed by a respective binary number programming signal; and means for providing a voltage response to change in the difference of charge on the respective capacitances of said pair of output lines respectively identified by the same ordinal number as said processor and by the ordinal number higher by N respective to their surroundings, which voltage response corresponds to said output voltage response for said processor to said plurality M in number of input signals—said plurality N in number of processors being connected in a combination together with:

means for applying M input signal voltages to respective ones of said first through $M^{th}$ input lines;

a memory array for binary numbers having N pluralities of M word storage elements within the confines of said monolithic integrated circuit, said N plurality of word storage elements being identified by respective ones of the consecutive ordinal numbers first through $N^{th}$, the M word storage elements in each of said first through $N^{th}$ pluralities of word storage elements being respectively identified by connective ordinal numbers first through $M^{th}$, each said word storage element temporarily storing the binary programming signals for said digital capacitors identified by the same ordinal number and by the ordinal number M higher within the one of said first through $N^{th}$ processors identified by the same ordinal number as the plurality of word storage elements that word storage element is included within; and means for serially re-writing the contents of each said word storage element in said first through $N^{th}$ pluralities of word storage elements.

44. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a plurality, M in number, of input lines respectively identified by connective ordinal numbers first through $M^{th}$, M being a positive integer, and shared with the others of said plurality N in number of processors;

a pair of respective output lines respectively identified by the same ordinal number as said processor and by the ordinal number higher by N;

first through $M^{th}$ digital capacitors respectively connecting said first through $M^{th}$ input lines to said output line identified by the same ordinal number as said processor, and $(M+1)^{th}$ through $2M^{th}$ digital capacitors respectively connecting said first through $M^{th}$ input lines to said second output line identified by the ordinal number higher by N than the ordinal number of said processor, each said digital capacitor having a capacitance that is programmed by a respective binary number programming signal;

a respective plurality of binary counters M in number identified by respective ones of the ordinal numbers first through $M^{th}$, each of said first through $M^{th}$ binary counters connected for supplying the programming signal for said digital capacitors identified by the same ordinal number and by the ordinal number M higher within said processor; and means for providing a voltage response to change in the difference of charge on the respective capacitances of said pair of output lines respectively identified by the same ordinal number as said processor and by the ordinal number higher by N respective to their surroundings, which voltage response corresponds to said output voltage response for said processor to said plurality M in number of input signals—said plurality N in number of processors being connected in a combination together with:

means for applying M input signal voltages to respective ones of said first through $M^{th}$ input lines; and means for controlling the incrementing and decrementing of the binary count in each of said binary counters.

45. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a plurality, M in number, of input lines respectively identified by consecutive ordinal numbers, first through $M^{th}$, for receiving respective ones of said input voltage signals;

a plurality, M in number of further input lines respectively identified by consecutive ordinal numbers $(M+1)^{th}$ through $2M^{th}$;

means for applying to each further input line an input signal the same in amplitude but opposite in polarity as the input signal received by an input line paired therewith and identified by the ordinal number lower by M;

a pair of respective output lines respectively identified by the same ordinal number as said processor and by the ordinal number higher by N;

first through $M^{th}$ digital capacitors respectively connecting said first through $M^{th}$ input lines to said output line identified by the same ordinal number as said processor, $(M+1)^{th}$ through $2M^{th}$ digital capacitors respectively connecting said first through $M^{th}$ input lines to said output line identified by the ordinal number higher by N than the ordinal number of said processor, $(2M+1)^{th}$ through $3M^{th}$ digital capacitors respectively connecting said $(M+1)^{th}$ through $2M^{th}$ input lines to said output line identified by the same ordinal number as said processor, and $(3M+1)^{th}$ through $4M^{th}$ digital capacitors respectively connecting said $(M+1)^{th}$ through $2M^{th}$ input lines to said output line identified by the ordinal number higher by N than the ordinal number of said processor, each said digital capacitor having a capacitance that is programmed by a respective binary number programming signal;

means for providing a voltage response to change in the difference of charge on the respective capacitances of said pair of output lines respectively identified by the same ordinal number as said processor and by the ordinal number higher by N respective to their surroundings, which voltage response corresponds to said output voltage response for said processor to said plurality M in number of input signals—said plurality N in number of processors being connected in a combination together with:

means for applying M input signal voltages in balanced form each to a respective pair of said input lines, identified by ordinal numbers M apart;

a memory array for binary numbers having N pluralities of M word storage elements within the confines of said monolithic integrated circuit, said N pluralities of word storage elements being identified by respective ones of the consecutive ordinal numbers first through $N^{th}$, the M word storage elements in each of said first through $N^{th}$ pluralities of word storage elements being respectively identified by connective ordinal numbers first through $M^{th}$, each said word storage element temporarily storing the binary programming signals for said digital capacitors identified by the same ordinal number, by the ordinal number M higher, by the ordinal number 2M higher and by the ordinal number 3M higher within the one of said first through $N^{th}$ processors identified by the same ordinal number as the plurality of word storage elements that word storage element is included within; and means for serially re-writing the contents of each said word storage element in said first through $N^{th}$ pluralities of word storage elements.

46. Within the confines of a monolithic integrated circuit, a plurality N in number of processors identified by respective ones of the consecutive ordinal numbers first through $N^{th}$, each of said first through $N^{th}$ processors for providing in response to a plurality of input signal voltages M in number a respective weighted summation of said input signal voltages, each of said first through $N^{th}$ processors comprising:

a plurality, M in number, of input lines respectively identified by consecutive ordinal numbers, first through $M^{th}$, for receiving respective ones of said input voltage signals;

a plurality, M in number of further input lines respectively identified by consecutive ordinal numbers $(M+1)^{th}$ through $2M^{th}$;

means for applying to each further input line an input signal the same in amplitude but opposite in polarity as the input signal received by an input line paired therewith and identified by the ordinal number lower by M;

a pair of respective output lines respectively identified by the same ordinal number as said processor and by the ordinal number higher by N;

first through $M^{th}$ digital capacitors respectively connecting said first through $M^{th}$ input lines to said output line identified by the same ordinal number as said processor, $(M+1)^{th}$ through $2M^{th}$ digital capacitors respectively connecting said first through $M^{th}$ input lines to said output line identified by the ordinal number higher by N than the ordinal number of said processor, $(2M+1)^{th}$ through $3M^{th}$ digital capacitors respectively connecting said $(M+1)^{th}$ through $2M^{th}$ input lines to said output line identified by the same ordinal number as said processor, and $(3M+1)^{th}$ through $4M^{th}$ digital capacitors respectively connecting said $(M+1)^{th}$ through $2M^{th}$ input lines to said output line identified by the ordinal number higher by N than the ordinal number of said processor, each said digital capacitor having a capacitance that is programmed by a respective binary number programming signal;

a plurality of binary counters M in number identified by respective ones of the ordinal numbers first through $M^{th}$, each of said first through $M^{th}$ binary counters connected for supplying the programming signal for said digital capacitors identified by the same ordinal number, by the ordinal number M higher, by the ordinal number 2M higher, and by the ordinal number 3M higher;

means for providing a voltage response to change in the difference of charge on the respective capacitances of said pair of output lines respectively identified by the same ordinal number as said processor and by the ordinal number higher by N respective to their surroundings, which voltage response corresponds to said output voltage response for said processor to said plurality M in number of input signals—said plurality N in number of processors being connected in a combination together with:

means for applying M input signal voltages in balanced form each to a respective pair of said input lines, identified by ordinal numbers M apart; and means for controlling the incrementing and decrementing of the binary count in each of said binary counters.

47. A processor for providing an output voltage response to a plurality M in number of input voltage signals, M being a positive integer, said processor comprising:

a plurality, M in number, of input lines respectively identified by consecutive ordinal numbers, first through M$^{th}$, for receiving respective ones of said input voltage signals identified by corresponding ordinal numbers;

a pair of output lines, each insulated from its surroundings and exhibiting respective capacitance respective to its surroundings;

exclusive means for connecting said first through M$^{th}$ input lines to said pair of output lines, said means connecting said first through M$^{th}$ input lines to said pair of output lines without any paths for substantial direct current conduction between said input and said output lines and including a respective capacitive element for connecting each of said first through M$^{th}$ input lines to each of certain said output lines, at least certain ones of which capacitive elements are each of a type the capacitance of which is programmable responsive to a respective programming signal and is altered during the operation of said processor responsive to any change in said programming signal; and means for generating a voltage response to change in the difference of charge on the respective capacitances of said pair of output lines respective to their surroundings, which voltage response corresponds to said output voltage response to said plurality M in number of input voltage signals.

48. A processor as set forth in claim 47 wherein said means for generating a voltage response to change in the difference of charge on the respective capacitances of said pair of output lines respective to their surroundings is of a type in which said output voltage response is a sigmoidal response to a weighted summation of said plurality M in number of input voltage signals.

49. A neural net layer comprising a plurality M in number of processors as set forth in claim 48, connected for supplying respective output voltage responses to said plurality M in number of input voltage signals, said output responses being identified by respective ones of the ordinal numbers first through M$^{th}$.

50. A neural net comprising a plurality, L in number, of neural net layers as set forth in claim 49 said neural net layers respectively identified by consecutive ordinal numbers zeroeth through (L−1)$^{th}$, L being a positive integer, the first through N$^{th}$ output voltage responses of each said neural net layers except the zeroeth being applied as the first through M$^{th}$ input voltage signals of the neural net layer with next lower ordinal number.

51. A neural net as set forth in claim 50 in combination with:

means for training said neural net during at least one training period of time, each followed by a respective operating period of time, said means being of a type for performing back propagation through each neural net layer with weightings determined by said capacitive elements in said neural net layer.

52. A processor for providing an output voltage response to a plurality M in number of input voltage signals, M being a positive integer, said processor comprising:

a plurality, M in number, of input lines respectively identified by consecutive ordinal numbers, first through M$^{th}$, for receiving ones of said input voltage signals identified by corresponding ordinal numbers;

a plurality, M in number of further input lines respectively identified by consecutive ordinal numbers (M+1)$^{th}$ through 2M$^{th}$;

means for applying to each further input line an input signal the same in amplitude but opposite in polarity as the input signal received by an input line paired therewith and identified by the ordinal number lower by M;

a pair of output lines, each insulated from its surroundings and exhibiting respective capacitance respective to its surroundings;

exclusive means for connecting said first through 2M$^{th}$ input lines to said pair of output lines, said means connecting said first through 2M$^{th}$ input lines to said pair of output lines without any paths for substantial direct current conduction between said input and said output lines and including respective capacitive elements connecting each of said input lines to each of said output lines, at least certain ones of which capacitive elements are each of a type the capacitance of which is programmable responsive to a respective programming signal and is altered during the operation of said processor responsive to any change in said programming signal; and means for providing a voltage response to change in the difference of charge on the respective capacitances of said pair of output lines respective to their surroundings, which voltage response corresponds to said output voltage response to said plurality M in number of input voltage signals.

53. A processor as set forth in claim 52 wherein said means for generating a voltage response to change in the difference of charge on the respective capacitances of said pair of output lines respective to their surroundings is of a type in which said output voltage response is a sigmoidal response to a weighted summation of said plurality M in number of input voltage signals.

54. A neural net layer comprising a plurality M in number of processors as set forth in claim 53, connected for supplying respective output voltage responses to said plurality M in number of input voltage signals, said output voltage responses being identified by respective ones of the ordinal numbers first through M$^{th}$.

55. A neural net comprising a plurality, L in number, of neural net layers as set forth in claim 54 said neural net layers respectively identified by consecutive ordinal numbers zeroeth through (L−1)$^{th}$, L being a positive integer, the first through M$^{th}$ output voltage responses of each said neural net layers except the zeroeth being applied as the first through M$^{th}$ input voltage signals of the neural net layer with next lower ordinal number.

56. A neural net as set forth in claim 55 in combination with:

means for training said neural net during at least one training period of time, each followed by a respective operating period of time, said means being of a type for performing back propagation through each neural net layer with weightings determined by said capacitive elements in said neural net layer.

* * * * *